United States Patent
Park et al.

(10) Patent No.: US 9,821,262 B2
(45) Date of Patent: Nov. 21, 2017

(54) AIR CLEANER AND METHOD FOR CONTROLLING AN AIR CLEANER

(71) Applicant: LG ELECTRONICS INC., Seoul (KR)

(72) Inventors: Jaekyun Park, Seoul (KR); Hyunpil Ha, Seoul (KR); Soonki Jung, Seoul (KR); Yeongcheol Mun, Seoul (KR); Soohyun Bae, Seoul (KR); Daesung Choi, Seoul (KR); Jongoh Sun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/364,410

(22) Filed: Nov. 30, 2016

(65) Prior Publication Data

US 2017/0246582 A1    Aug. 31, 2017

(30) Foreign Application Priority Data

Feb. 26, 2016 (KR) .......................... 10-2016-0023663
Oct. 6, 2016 (KR) .......................... 10-2016-0128912
Oct. 25, 2016 (KR) .......................... 10-2016-0139376

(51) Int. Cl.
*B01D 46/44* (2006.01)
*F24F 1/02* (2011.01)
(Continued)

(52) U.S. Cl.
CPC ....... *B01D 46/442* (2013.01); *B01D 46/0008* (2013.01); *B01D 46/0041* (2013.01);
(Continued)

(58) Field of Classification Search
CPC combination set(s) only.
See application file for complete search history.

(56) References Cited

U.S. PATENT DOCUMENTS

| 4,365,980 A | 12/1982 | Culbert et al. |
| 5,117,652 A * | 6/1992 | Takeuchi ............... F24F 1/025 62/291 |

(Continued)

FOREIGN PATENT DOCUMENTS

| CN | 102661295 | 12/2014 |
| CN | 204141826 | 2/2015 |

(Continued)

OTHER PUBLICATIONS

Korean Office Action dated Jan. 26, 2017 issued in Application No. 10-2016-0073055.

(Continued)

*Primary Examiner* — Robert Clemente
(74) *Attorney, Agent, or Firm* — Ked & Associates LLP

(57) ABSTRACT

An air cleaner and a method for controlling an air cleaner are provided. The air cleaner may include a first air cleaning module having a first fan and a first filter; a second air cleaning module having a second fan and a second filter, the second air cleaning module provided vertically over the first air cleaning module; an air flow controller provided at an upper side of the second air cleaning module and including a circulation fan; a sensor configured to sense a pollution level in a room space; an input configured to receive input of a command for an operation mode of a plurality of operation modes to operate the first and second air cleaning modules and the air flow controller; and a controller configured to drive at least one of the first fan, the second fan, or the circulation fan selectively and determine an amount of discharge air flow. Based on at least one of an operation mode input or the pollution level, the controller may operate one of (1) the first fan, (2) the first and second fans, (3) the first and second fans and the circulation fan, or (4) the second fan and the circulation fan.

20 Claims, 21 Drawing Sheets

(51) Int. Cl.
*B01D 46/00* (2006.01)
*F24F 3/16* (2006.01)

(52) U.S. Cl.
CPC .............. *F24F 1/02* (2013.01); *F24F 3/1603* (2013.01); *B01D 2267/30* (2013.01); *F24F 2003/1614* (2013.01)

(56) References Cited

U.S. PATENT DOCUMENTS

| | | | |
|---|---|---|---|
| 5,264,015 A | 11/1993 | Matsui | |
| 5,334,248 A | 8/1994 | Kwak | |
| 5,641,343 A | 6/1997 | Frey | |
| 5,753,000 A | 5/1998 | Chiu et al. | |
| 6,494,940 B1 * | 12/2002 | Hak | A61L 9/16 55/471 |
| 8,212,146 B1 | 7/2012 | Moore | |
| 2006/0107834 A1 | 5/2006 | Vandenbelt et al. | |
| 2006/0201119 A1 | 9/2006 | Song | |
| 2006/0277875 A1 | 12/2006 | Schuld | |
| 2007/0137489 A1 | 6/2007 | Luo | |
| 2007/0221061 A1 * | 9/2007 | Steiner | B03C 3/32 96/63 |
| 2010/0225012 A1 * | 9/2010 | Fitton | F24F 1/01 261/116 |
| 2011/0308210 A1 * | 12/2011 | Crabtree | B01D 46/0005 55/483 |
| 2013/0055692 A1 | 3/2013 | Cecchi et al. | |
| 2014/0216259 A1 | 8/2014 | Iwaki | |
| 2015/0306533 A1 * | 10/2015 | Matlin | B01D 46/448 96/420 |
| 2016/0184753 A1 * | 6/2016 | Chu | B01D 46/002 96/74 |

FOREIGN PATENT DOCUMENTS

| | | |
|---|---|---|
| CN | 104603545 | 5/2015 |
| DE | 9312051 | 10/1993 |
| EP | 1 950 500 | 7/2008 |
| EP | 2 072 920 | 6/2009 |
| EP | 2 476 968 | 7/2012 |
| EP | 2 837 897 | 2/2015 |
| EP | 2 853 835 | 4/2015 |
| GB | 2 345 005 | 6/2000 |
| GB | 2516058 | 1/2015 |
| JP | H 06-50180 | 6/1994 |
| JP | 2000-354724 | 12/2000 |
| JP | 2006-022977 | 1/2006 |
| JP | 2007-105578 | 4/2007 |
| JP | 2012-120720 | 6/2012 |
| JP | 2013-217580 | 10/2013 |
| JP | 2014-507277 | 3/2014 |
| JP | 2014-119224 | 6/2014 |
| JP | 2015-080737 | 4/2015 |
| JP | 2015-108497 | 6/2015 |
| JP | 5740503 | 6/2015 |
| KR | 20-1993-0002444 | 5/1993 |
| KR | 10-0139487 | 6/1998 |
| KR | 20-0173274 | 3/2000 |
| KR | 20-0289687 | 9/2002 |
| KR | 20-0342073 | 2/2004 |
| KR | 10-2004-0056151 | 6/2004 |
| KR | 10-2004-0108462 | 12/2004 |
| KR | 10-0508312 | 8/2005 |
| KR | 10-2005-0115343 | 12/2005 |
| KR | 10-2006-0023457 | 3/2006 |
| KR | 10-2009-0058446 | 6/2009 |
| KR | 10-2010-0056797 | 5/2010 |
| KR | 10-2010-0062121 | 6/2010 |
| KR | 10-2010-0070069 | 6/2010 |
| KR | 10-2012-0060279 | 6/2012 |
| KR | 10-2012-0071992 | 7/2012 |
| KR | 10-1168738 | 7/2012 |
| KR | 10-2012-0136137 | 12/2012 |
| KR | 10-2013-0036447 | 4/2013 |
| KR | 10-1342606 | 12/2013 |
| KR | 10-2014-0039703 | 4/2014 |
| KR | 10-1385290 | 4/2014 |
| KR | 10-2014-0092953 | 7/2014 |
| KR | 10-2014-0094414 | 7/2014 |
| KR | 10-2015-0005594 | 1/2015 |
| KR | 10-1500501 | 3/2015 |
| KR | 10-1516365 | 5/2015 |
| KR | 10-2016-0012796 | 2/2016 |
| KR | 10-2016-0015084 | 2/2016 |
| KR | 10-2016-0017587 | 2/2016 |
| KR | 10-1599634 | 3/2016 |
| KR | 10-2016-0048499 | 5/2016 |
| KR | 10-2016-0053649 | 5/2016 |
| WO | WO 2010/109944 | 9/2010 |

OTHER PUBLICATIONS

Korean Office Action dated Jan. 26, 2017 issued in Application No. 10-2016-0073083.
Korean Office Action dated Jan. 26, 2017 issued in Application No. 10-2016-0077888.
International Search Report dated Mar. 21, 2017 issued in Application No. PCT/KR2016/013907.
U.S. Office Action dated Jan. 20, 2017 issued in U.S. Appl. No. 15/363,156.
U.S. Office Action dated Jan. 20, 2017 issued in U.S. Appl. No. 15/364,369.
U.S. Office Action dated Jan. 23, 2017 issued in U.S. Appl. No. 15/363,204.
U.S. Office Action dated Jan. 23, 2017 issued in U.S. Appl. No. 15/364,467.
U.S. Office Action dated Feb. 10, 2017 issued in co-pending U.S. Appl. No. 15/363,111.
U.S. Appl. No. 15/363,111, filed Nov. 29, 2016.
U.S. Appl. No. 15/363,156, filed Nov. 29, 2016.
U.S. Appl. No. 15/363,204, filed Nov. 29, 2016.
U.S. Appl. No. 15/364,467, filed Nov. 30, 2016.
U.S. Appl. No. 15/363,438, filed Nov. 29, 2016.
U.S. Appl. No. 15/363,587, filed Nov. 29, 2016.
U.S. Appl. No. 15/363,643, filed Nov. 29, 2016.
U.S. Appl. No. 15/364,369, filed Nov. 30, 2016.
U.S. Appl. No. 15/441,957, filed Feb. 24, 2017.
International Search Report dated Mar. 30, 2017 issued in Application No. PCT/KR2016/013912.
International Search Report dated Mar. 30, 2017 issued in Application No. PCT/KR2016/013908.
Korean Office Action dated Apr. 20, 2017 issued in Application No. 10-2016-0132790.
European Search Report dated Jun. 21, 2017 issued in Application No. 16201095.3.
European Search Report dated Apr. 25, 2017 issued in Application No. 16201086.2-1602.
European Search Report dated Apr. 25, 2017 issued in Application No. 17157045.0-1602.
Korean Office Action dated Jun. 21, 2017 (10-2017-0056865).
Korean Office Action dated Jun. 21, 2017 (10-2017-0056885).
Korean Office Action dated Jun. 21, 2017 (10-2017-0056886).
U.S. Office Action issued in U.S. Appl. No. 15/364,369 dated Jul. 14, 2017.
European Search Report dated Jun. 21, 2017 issued in Application No. 16201091.8.
Korean Office Action dated Jun. 21, 2017 issued in Application No. 10-2017-0056789.
Korean Office Action dated Jun. 21, 2017 issued in Application No. 10-2017-0056790.
Korean Office Action dated Jun. 21, 2017 issued in Application No. 10-2017-0056791.
European Search Report dated Jun. 23, 2017 issued in Application No. 16201089.6.
European Search Report dated Jun. 23, 2017 issued in Application No. 16201088.8.

(56) References Cited

OTHER PUBLICATIONS

Korean Office Action dated Jun. 30, 2017 issued in Application No. 10-2017-0056864.
European Search Report dated Jul. 14, 2017 issued in Application No. 16201094.6.
European Search Report dated Jul. 20, 2017 issued in Application No. 16201091.2.
Korean Notice of Allowance dated Aug. 15, 2017 issued in Application No. 10-2016-0074369.
Korean Office Action dated Aug. 22, 2017 issued in Application No. 10-2016-0073055.
European Search Report dated Jul. 14, 2017 issued in Application No. 16201092.0.
Korean Office Action dated Aug. 31, 2017 issued in Application No. 10-2016-0073063.

* cited by examiner

AIR CLEANER AND METHOD FOR CONTROLLING AN AIR CLEANER

CROSS-REFERENCE TO RELATED APPLICATION(S)

The present application claims priority under 35 U.S.C. 119 and 35 U.S.C. 365 to Korean Patent Application No. 10-2016-0128912 filed in Korea on Oct. 6, 2016, No. 10-2016-0023663 filed in Korea on Feb. 26, 2016, and No. 10-2016-0139376 filed in Korea on Oct. 25, 2016, which are hereby incorporated by reference in their entirety.

BACKGROUND

1. Field

An air cleaner and a method for controlling are disclosed herein.

2. Background

An air cleaner is a device that suctions in and purifies contaminated air and then discharges purified air. For example, the air cleaner may include a blower that introduces outside air into the air cleaner and a filter capable of filtering dust and bacteria, for example.

Generally, the air cleaner is configured to purify an indoor space, such as a home or an office. According to the air cleaner in the related art, there is a problem that a capacity thereof is limited, and thus, purification of air in an entire indoor space is limited. Accordingly, air around the air cleaner is purified whereas air in a space away from the air cleaner is not purified.

In order to solve this problem, there are efforts to improve a performance of a fan provided in the air cleaner. However, noise generated by the fan gradually increases as a blowing amount of the fan increases. Accordingly, there is a problem is that reliability of the product is decreased. Finally, there is inconvenience that the air cleaner has to be moved by a user in order to purify air in the desired space.

A related art air cleaner is disclosed in Korean Publication No. KR10-2012-0071992 published on Jul. 3, 2012 and entitled AIR CLEANER, which is hereby incorporated by reference. According to this disclosure, air cleaning components, such as the fan and a filter are installed, in an inside of a case having a substantially rectangular parallelepiped shape of a main body of the air cleaner. Air suction ports are formed on a side portion and a lower portion of the main body of the air cleaner and an air discharge port is formed on an upper portion of the main body thereof.

According to this configuration, there is a problem in that a suction capacity is reduced as the contaminated air is suctioned from a limited direction, that is, from a side direction and a lower direction relative to the air cleaner. A corner portion of the case having a rectangular parallelepiped shape provides structural resistance interfering with the suction of air.

In addition, there is a problem that an air cleaning function is limited as purified air does not flow to a space away from the air cleaner, whereas air around the air cleaner is purified. That is, the air which is purified in the air cleaner is discharged in only one direction, that is, only in an upward direction. Further, there is a problem that a blowing capacity is limited as only one blowing fan is provided in the main body of the air cleaner.

BRIEF DESCRIPTION OF THE DRAWINGS

Embodiments will be described in detail with reference to the following drawings in which like reference numerals refer to like elements, and wherein.

DETAILED DESCRIPTION

Figure 1:
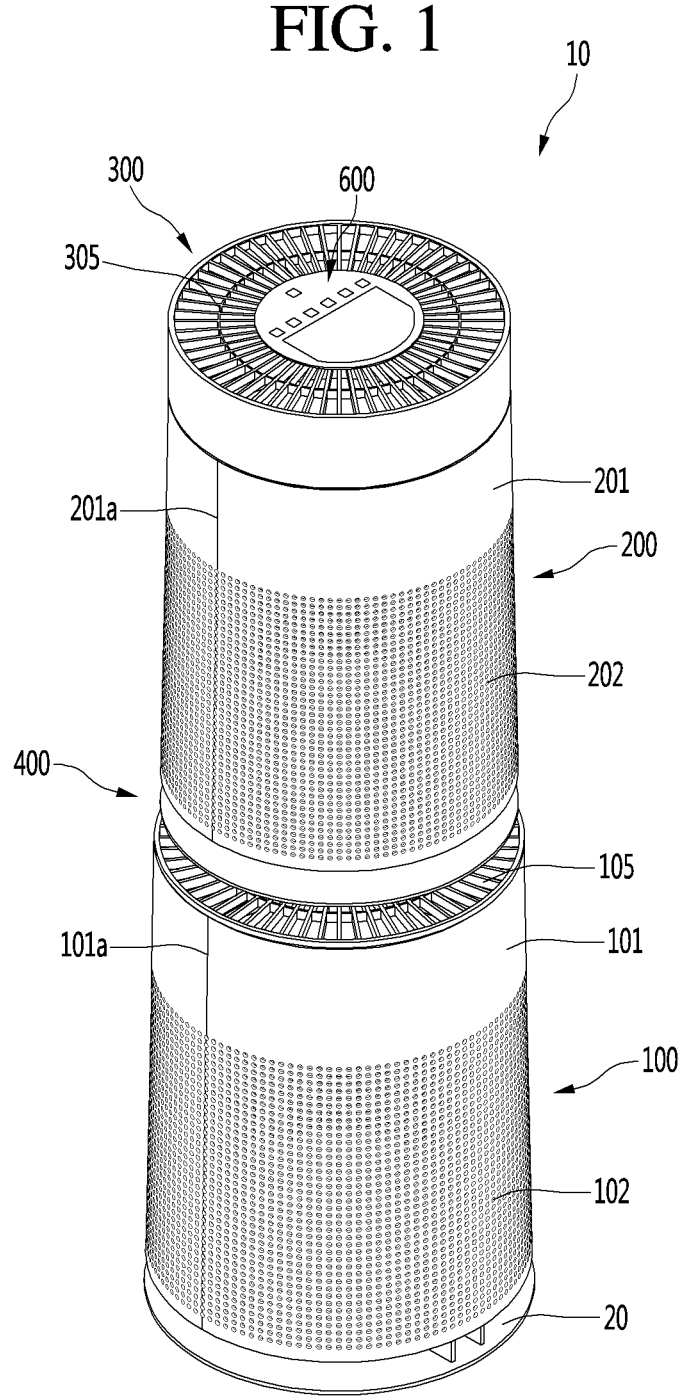
FIG. 1 is a perspective view of an air cleaner according to an embodiment.

Hereinafter, embodiments will be described in detail with reference to the illustrative drawings. Regarding the reference numerals assigned to the components in the drawings, it should be noted that the same components may be designated by the same reference numerals, wherever possible, even though they are shown in different drawings. Also, in the description of embodiments, specific description of known related configuration or functions may be omitted when it is deemed that such description may cause ambiguous interpretation of the present invention.

Also, in the description of embodiments, terms such as first, second, A, B, (a), (b) or the like may be used herein when describing components. Each of these terminologies is not used to define an essence, order or sequence of a corresponding component but used merely to distinguish the corresponding component from other component(s). In a case where it is described that any component is "connected" or "coupled" to another component, the component may be directly or indirectly connected or coupled to another component. However, it is to be understood that another component may be "connected" or "coupled" between the components.

Also, in the description of embodiments, terms such as first, second, A, B, (a), (b) or the like may be used herein when describing components. Each of these terminologies is not used to define an essence, order or sequence of a corresponding component but used merely to distinguish the corresponding component from other component(s). In a case where it is described that any component is "connected" or "coupled" to another component, the component may be directly or indirectly connected or coupled to another component. However, it is to be understood that another component may be "connected" or "coupled" between the components.

FIG. 1 is a perspective view of an air cleaner according to an embodiment. With reference to FIG. 1, the air cleaner 10 according to this embodiment may include blowing devices or blowers 100 and 200 that generate air flow and a flow adjusting device or adjuster 300 that adjusts a discharge direction of the air flow generated in the blowing devices 100 and 200. The blowing devices 100 and 200 may include a first blowing device 100 that generates a first air flow and a second blowing device 200 that generates a second air flow.

The first blowing device 100 and the second blowing device 200 may be provided in a vertical direction. For example, the second blowing device 200 may be provided on or at an upper side of the first blowing device 100. In this case, the first air flow is a flow of indoor air suctioned from a lower side of the air cleaner 10 and the second air flow is a flow of indoor air suctioned from an upper side of the air cleaner 10.

The air cleaner 10 may include cases 101 and 201 that form an outer appearance thereof. That is, the cases 101 and 201 may include a first case 101 that forms an outer appearance of the first blowing device 100. The first case 101 may have a cylindrical shape. An upper portion of the first case 101 may have a diameter which is less than a diameter of a lower portion thereof. That is, the first case 101 may have a truncated cone shape.

The first blowing device 100 and the second blowing device 200 may be referred to as a "first air cleaning module or cleaner 100" and a "second air cleaning module or cleaner 200", respectively, in that the first blowing device 100 and the second blowing device 200 perform a function of cleaning air in a space to be cleaned. The first blowing device 100 may be referred to as a "lower air cleaning module or cleaner" or "lower module or cleaner" in that the first blowing device 100 is provided at a lower portion of the air cleaner 10 and the second blowing device 200 may be referred to as an "upper air cleaning module or cleaner" or "upper module or cleaner" in that the second blowing device 200 is provided at an upper portion of the air cleaner 10. The flow adjusting device 300 may be referred to as "flow adjusting module or adjuster 300" or "flow control module or controller 300".

The first case 101 may include a first separation portion 101a at which two parts which constitute the first case 101 may be assembled or disassembled. The first case 101 may further include a hinge portion or hinge which is provided on an opposite of the first separation portion 101a. The two parts may be capable of being relatively rotated about the hinge portion.

The first case 101 may include a first suction portion or inlet 102 through which air may be suctioned in a radial direction. The first suction portion 102 may include one or more through hole formed to pass through at least a portion of the first case 101. A plurality of first suction portions 102 may be provided.

The plurality of first suction portions 102 may be evenly provided in a circumferential direction along an outer circumferential surface of the first case 101 so that air suction may be performed in any direction relative to the first case 101. That is, air may be suctioned in 360 degree directions relative to a center line that extends in the vertical direction and passes through an inside center of the first case 101.

Accordingly, a suction amount of air may be increased by the first case 101 having a cylindrical shape and the plurality of first suction portions 102 formed along the outer circumferential surface of the first case 101. Flow resistance to suctioned air may be reduced by avoiding a cube shape having edges or edge portions such as the case of the related art air cleaner.

Air which is suctioned in through the first suction portion 102 may flow substantially in the radial direction from the outer circumferential surface of the first case 101. Directions may be defined as follows. Referring to the FIG. 1, the vertical direction may refer to an axial direction and a transverse direction may refer to the radial direction. The axial direction may correspond to a central axis direction of the first fan 160 and the second fan 260, which are described hereinafter, that is, a motor shaft direction of the fan. The radial direction may refer to a direction which is perpendicular to the axial direction. The circumferential direction may refer to a virtual circle direction which is formed when rotating about the axial direction and having a distance of the radial direction as a rotational radius.

The first blowing device 100 may include a base 20 provided at a lower side of the first case 101 and placed on the ground. The base 20 may be positioned spaced apart from a lower end portion or end of the first case 101 in a downward direction. A base suction portion or inlet 103 may be formed in a space between the first case 101 and the base 20.

Air which is suctioned in through the base suction portion 103 may flow in an upward direction through a suction port 112 of a suction grill 110 (see FIG. 2), which may be provided in or at an upper side of the base 20. That is, the first blowing device 100 may include the plurality of suction portions 102 and the base suction portion 103. Air in a lower portion of the indoor space may be easily introduced to the first blowing device 100 through the plurality of suction portions 102 and the base suction portion 103. Accordingly, the suction amount of air may be increased.

A first discharge portion or outlet 105 may be formed at an upper portion of the first blowing device 100. The first discharge portion 105 may be formed on a first discharge grill 195 of a first discharge guide device or guide 190 (see, FIG. 8) which may be provided in the first blowing device 100. The first discharge guide 190 may form an outer appearance of an upper end portion or end of the first blowing device 100. Air discharged through the first discharge portion 105 may flow to the upper side in the axial direction.

The cases 101 and 201 may include a second case 201 which may form an outer appearance of the second blowing device 200. The second case 201 may have a cylindrical shape. An upper portion of the second case 201 may have a diameter which is less than a diameter of a lower portion thereof. That is, the second case 201 may have a truncated cone shape.

The second case 210 may include two parts which may be assembled or disassembled through a second separation portion 201a, which may include a locking device or lock. Like the first case 101, the second case 201 may be openable. The second case 201 may be the same or similar to the first case 101, and thus, repetitive disclosure has been omitted.

A diameter of a lower end portion of the second case 201 may be less than a diameter of the upper end portion or end of the first case 101. Accordingly, in a general shape of the cases 101 and 201, a lower cross-sectional area of the cases 101 and 102 may be formed to be greater than an upper cross-sectional area. Accordingly, the air cleaner 10 may be stably supported on the ground.

The second case 201 may include a second suction portion or inlet 202 through which air may be suctioned in the radial direction. The second suction portion 202 may include one or more through hole formed to pass through at least a portion of the second case 201. A plurality of the second suction portion 202 may be provided.

The plurality of second suction portions 202 may be evenly provided in the circumferential direction along an outer circumferential surface of the second case 201 so that air suction may be performed in any direction relative to the second case 201. That is, air may be suctioned in 360 degree directions relative to a center line that extends in the vertical direction and passes through an inside center of the second case 201.

Accordingly, a suction amount of air may be increased by the second case 201 having a cylindrical shape and the plurality of second suction portions 202 formed along the outer circumferential surface of the second case 201. Flow resistance to suctioned air may be reduced by avoiding a cube shape having an edge portions such as the case of the related are air cleaner. Air which is suctioned in through the second suction portion 202 may flow substantially in the radial direction from the outer circumferential surface of the second case 201.

The air cleaner 10 may include a dividing device or divider 400 provided between the first blowing device 100 and the second blowing device 200. By the dividing device 400, the second blowing device 200 may be positioned at the upper side of the first blowing device 100 spaced apart therefrom.

The air flow control device 300 may be provided at an upper side of the second blowing device 100. An air flow path of the second blowing device 100 may communicate with an air flow path of the air flow control device 300. The air passing through the second blowing device 100 may be discharged through a second discharge portion or outlet 305 to the outside via the air flow path of the air flow control device 300. The second discharge portion 305 may be provided on or at an upper end portion of the air flow control device 300.

Figure 13:
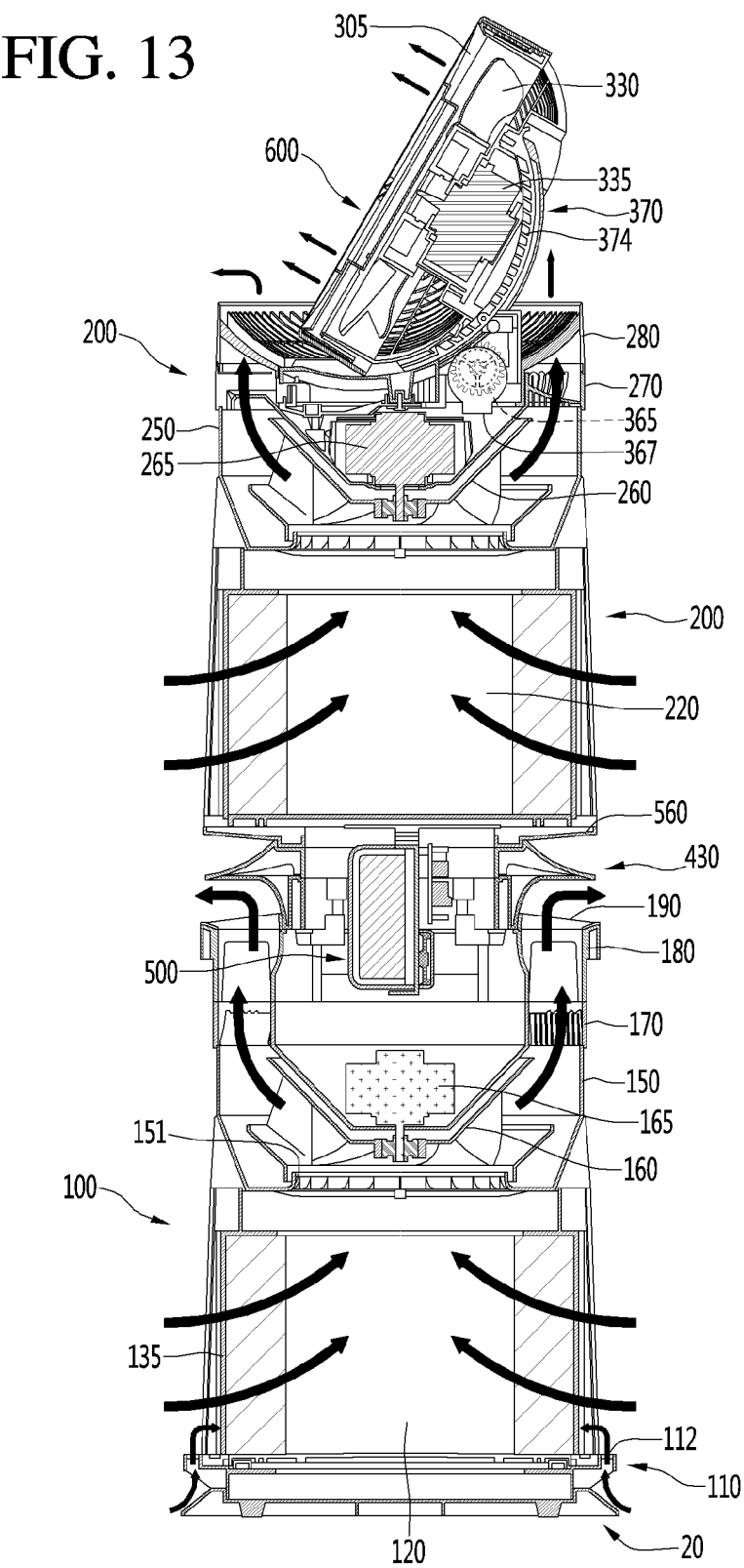
FIG. 13 is a view illustrating air flow through the air cleaner when the air flow control device is located at the second position according to an embodiment.

The air flow control device 300 may be movable. That is, the air flow control device 300 may be movable between a laid-out state (first position), as illustrated in FIG. 1, or an inclined erected state (second position), as illustrated in FIG. 13. In addition, a display device or display 600 that displays operation information of the air cleaner may be provided at an upper portion of the air flow control device 300. The display device 600 may be movable together with the air flow control device 300.

Figure 2:
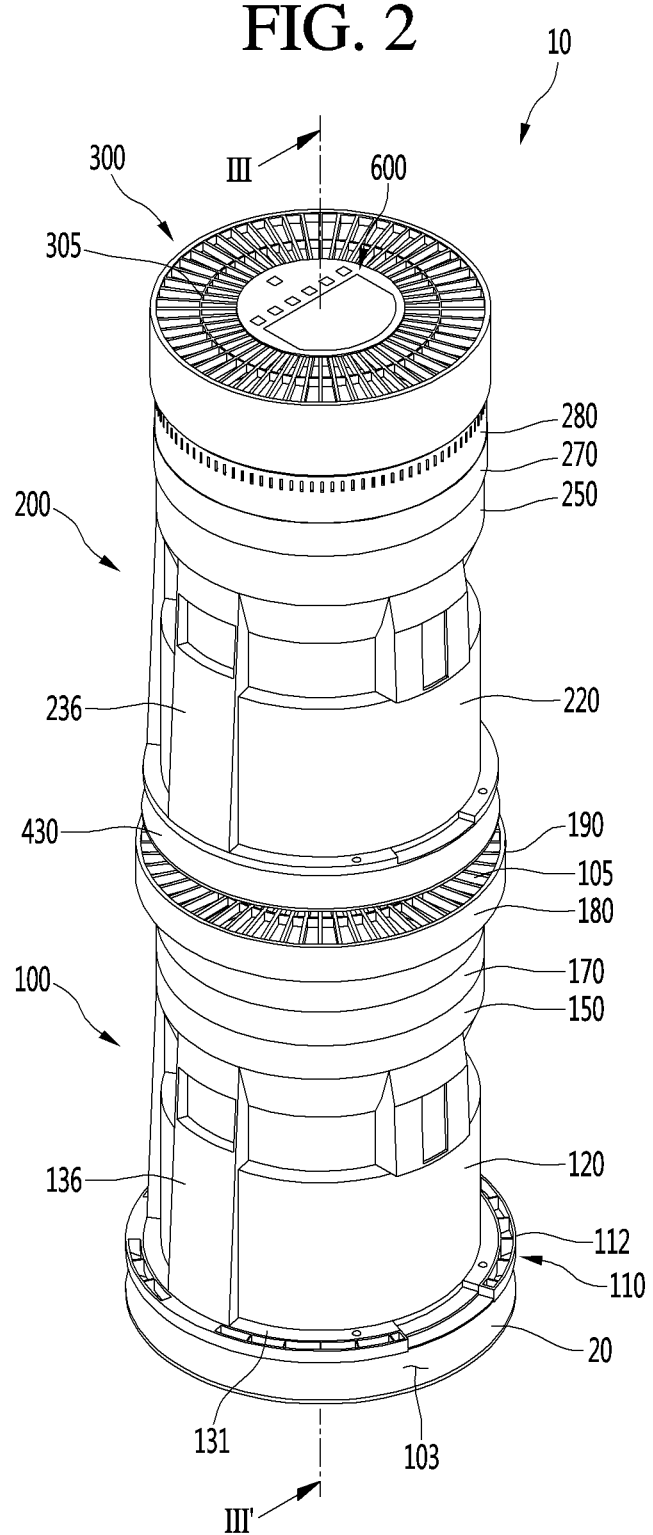
FIG. 2 is a perspective view illustrating an internal configuration of the air cleaner of FIG. 1.
Figure 3:
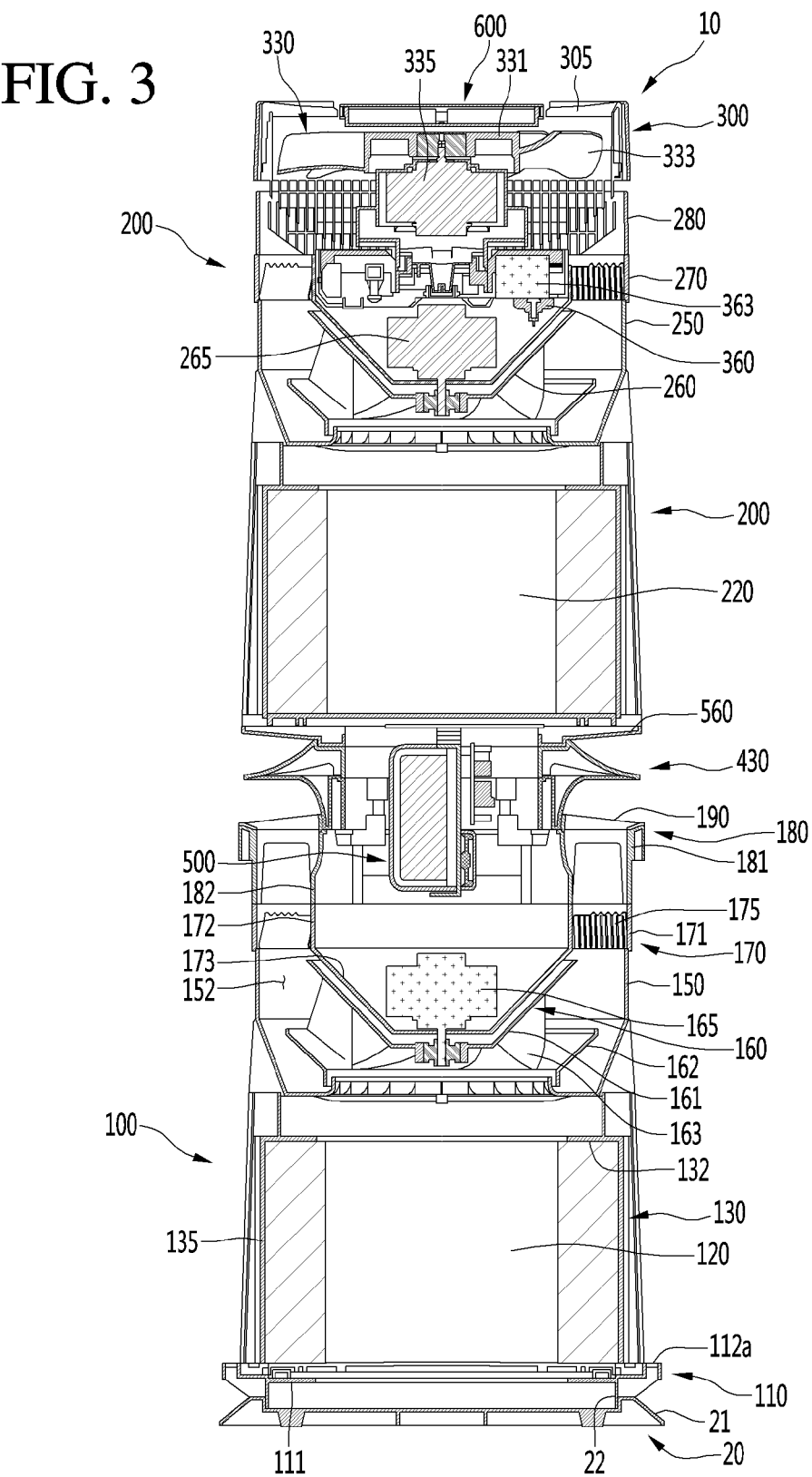
FIG. 3 is a cross-sectional view, taken along line III-III' in FIG. 2.

FIG. 2 is a perspective view of the air cleaner of FIG. 1. FIG. 3 is a cross-sectional view, taken along line III-III' of FIG. 2.

Referring to FIGS. 2 and 3, a base 20 and a suction grill 110, which may be disposed or provided on or at an upper side of the base 20 may be included in the first blowing device 100 according to this embodiment. The base 20 may include a base main body 21, which may be placed on the ground, and a base projecting portion or projection 22 that projects from the base main body 21 in the upward direction and on which the suction grill 110 may be placed. The base projecting portion 22 may be provided at both sides of the base 20.

The base main body 21 and the suction grill 110 may be spaced apart from each other by the base projecting portion 22. The base suction portion 103 which forms a suction space of air may be included between the base 20 and the suction grill 110.

The suction grill 110 may include a grill main body 111 having a substantially ring shape and a rim portion or rim 110 that protrudes from an outer circumferential surface of the grill main body 111 in the upward direction. By the configuration of the grill main body 111 and the rim portion, the suction grill 110 may have a stepped structure.

The suction grill 110 may include a suction portion or inlet 112 formed on the rim portion. The suction portion 112 may protrude along a circumference of the rim portion in the upward direction and extend in a circumferential direction. In addition, a plurality of suction holes 112a may be formed in the suction portion 112. The plurality of suction holes 112a may communicate with the base suction portion 103.

Air suctioned in through the plurality of suction holes 112a and the base suction portion 103 may pass through a first filter member or filter 120. The first filter may have a cylindrical shape and a filter surface that filters air. The air passing through the plurality of suction holes 112a may be introduced to an inside portion of the first filter 120 by passing through an outer circumferential surface of the cylindrical first filter 120.

The first blowing device 100 may further include a first filter frame 130, which may form a mounting space of the first filter 120. That is, the first filter frame 130 may include a first frame 131 which forms a lower portion of the first filter frame 130 and a second frame 132 which forms an upper portion of the first filter frame 130.

The first filter frame 130 may further include a first filter supporting portion or support 135 that extends from the first frame 131 to the second frame 132 in the upward direction. The first frame 131 and the second frame 132 may be spaced apart from each other by the first filter supporting portion 135. A plurality of first filter supporting portions 135 may be provided and the plurality of the first filter supporting portions 135 may be arranged in the circumferential direction, and thus, may be connected to rim portions or rims of the first frame 131 and the second frame 132. A mounting space of the first filter member 120 may be defined by the plurality of first filter supporting portions 135 and the first frame 131 and the second frame 132.

The first filter 120 may be detachably mounted in the mounting space. The first filter 120 may have a cylindrical shape and air may be introduced through the outer circumferential surface of the first filter 120. Impurities, such as fine dust in air, may be filtered in a process of passing through the first filter 120.

The air may be introduced from any direction relative to the first filter 120, by the first filter 120 having the cylindrical shape. Accordingly, a filtering area of air may be increased.

The first blowing device 100 may further include a first fan housing 150, which may be installed or provided on or at an outlet side of the first filter 120. A housing space portion or space 152, in which a first fan 160 may be accommodated, may be formed in the first fan housing 150. In addition, the first fan housing 150 may be supported by the first filter frame 130.

The first blowing device 100 may further include an ionizer 158 that removes or sterilizes smell particles in the air. The ionizer 158 may be coupled to the first fan housing 150 and be capable of acting on the air which flows inside of the first fan housing 150.

The sensor device 137 and the ionizer 158 may also be installed or provided in a second blowing device 200 described hereinafter. For example, the sensor device 137 and the ionizer 158 may be installed or provided in one of the first blowing device 100 or the second blowing device 200.

The first fan 160 may include a centrifugal fan that introduces air in the axial direction and then discharges air to the upper side in the radial direction. The first fan 160 may include a hub 161 to which a rotational shaft 165a of a first fan motor 165, which may be a centrifugal fan motor, may be coupled, a shroud 162 which may be disposed or provided in a state of being spaced apart from the hub 161, and a plurality of blades 163, which may be disposed or provided between the hub 161 and the shroud 162. The first fan motor 165 may be coupled to the upper side of the first fan 160.

The first blowing device 100 may further include a first air guide device or guide 170 that guides a flow of air being passed through the first fan 160 by being coupled to an upper side of the first fan 160. The first air guide 170 may include an outer wall 171 having a cylindrical shape and an inner wall 172 positioned on or at an inside of the outer wall 171 and having a cylindrical shape. The outer wall 171 may be disposed or provided to surround the inner wall 172. A first air flow path, through which air may flow may include circumferential surface of the outer wall 171 and an outer circumferential surface of the inner wall 172.

The first air guide 170 may include a guide rib 175 which may be disposed or provided on or in the first air flow path. The guide rib 175 may extend from the outer circumferential surface of the inner wall 172 to the inner circumferential surface of the outer wall 171. A plurality of guide ribs 175 may be disposed or provided spaced apart from each other. The plurality of guide ribs 175 may guide the air introduced to the first air flow path of the first air guide 170 via the first fan 160 in the upward direction.

The first air guide 170 may include a motor accommodating portion 173 that extends from the inner wall 172 to the lower side, and thus, may accommodate the first fan motor 165. The motor accommodating portion 173 may be inserted into the inside portion of the hub 161.

The first fan motor 165 may be supported to or at an upper side of the motor accommodating portion 173. The rotational shaft 165a of the first fan motor 165 may extend from the first fan motor 165 in the downward direction and be coupled to the shaft coupling portion 161a of the hub 161 through the lower surface portion of the motor accommodating portion 173.

The first blowing device 100 according to this embodiment may further include a second air guide device or guide 180 which may be coupled to an upper side of the air guide 170 and guide air having passed through the first air guide 170 to the discharging guide 190.

The second air guide 180 may include a first guide wall 181, which may have a substantially cylindrical shape, and a second guide wall 182, which may be positioned at an inside of the first guide wall 181 and have a substantially cylindrical shape. The first guide wall 181 may be disposed or provided to surround the second guide wall 182.

A second air flow path, through which air may flow, may be formed between an inner circumferential surface of the first guide wall 181 and an outer circumferential surface of the second guide wall 182. Air which flows along the first air flow path 172a of the first air guide 170 may flow in the upward direction through the second air flow path 185. The second air flow path 185 may be referred to as a "discharge flow path." In addition, the first discharge portion 105 may be provided on or at an upper side of the second air flow path 185.

A first space portion or space, in which at least a portion of a printed circuit board (PCB) device 500 may be accommodated, may be formed inside of the second guide wall 182 having a cylindrical shape. The PCB device 500 may include a power supply portion or power supply 520 and a main PCB 511.

The first blowing device 100 may further include a first discharge guide device or guide 190, which may be disposed or provided on or at an upper side of the second air guide 180, that is, an outlet side of air flow passing through the second air guide 180 relative to the air flow and guide the air discharge to outside of the air cleaner 10. A first discharge portion 105, through which air may be discharged is formed in the first discharging guide 190.

A dividing device 400 may be provided between the first blowing device 100 and the second blowing device 200. The dividing device 400 may include a dividing plate 430 that separates or blocks air flow generated in the first blowing device 100 and air flow generated in the second blowing device 200. By the dividing plate 430, the first and second blowing devices 100 and 200 may be spaced apart from each other in the vertical direction.

That is, a separation space in which the dividing plate 430 may be located or provided may be formed between the first and second blowing devices 100 and 200. The first discharge guide 190 of the first blowing device 100 may be located at a lower end portion or end of the separation space, and the lever supporting device 510 of the second blowing device 200 may be located at an upper end portion or end of the separation space.

The separation space may be divided into an upper space and a lower space by the dividing plate 430. The lower space may be a first space portion or space through which air discharged from the first discharge portion 105 of the first discharge guide 190 may pass in a process in which the air flows to the outside of the air cleaner 10. The upper space may be a second space portion or space that functions as a grasping space into which a user may put his or her hand when moving the air cleaner 10.

Air discharged from the first discharge portion 105 may be guided by the dividing plate 430 to flow to the outside of the air cleaner 10. Accordingly, it is possible to prevent the air from being introduced into the second blowing device 200.

Figure 4:
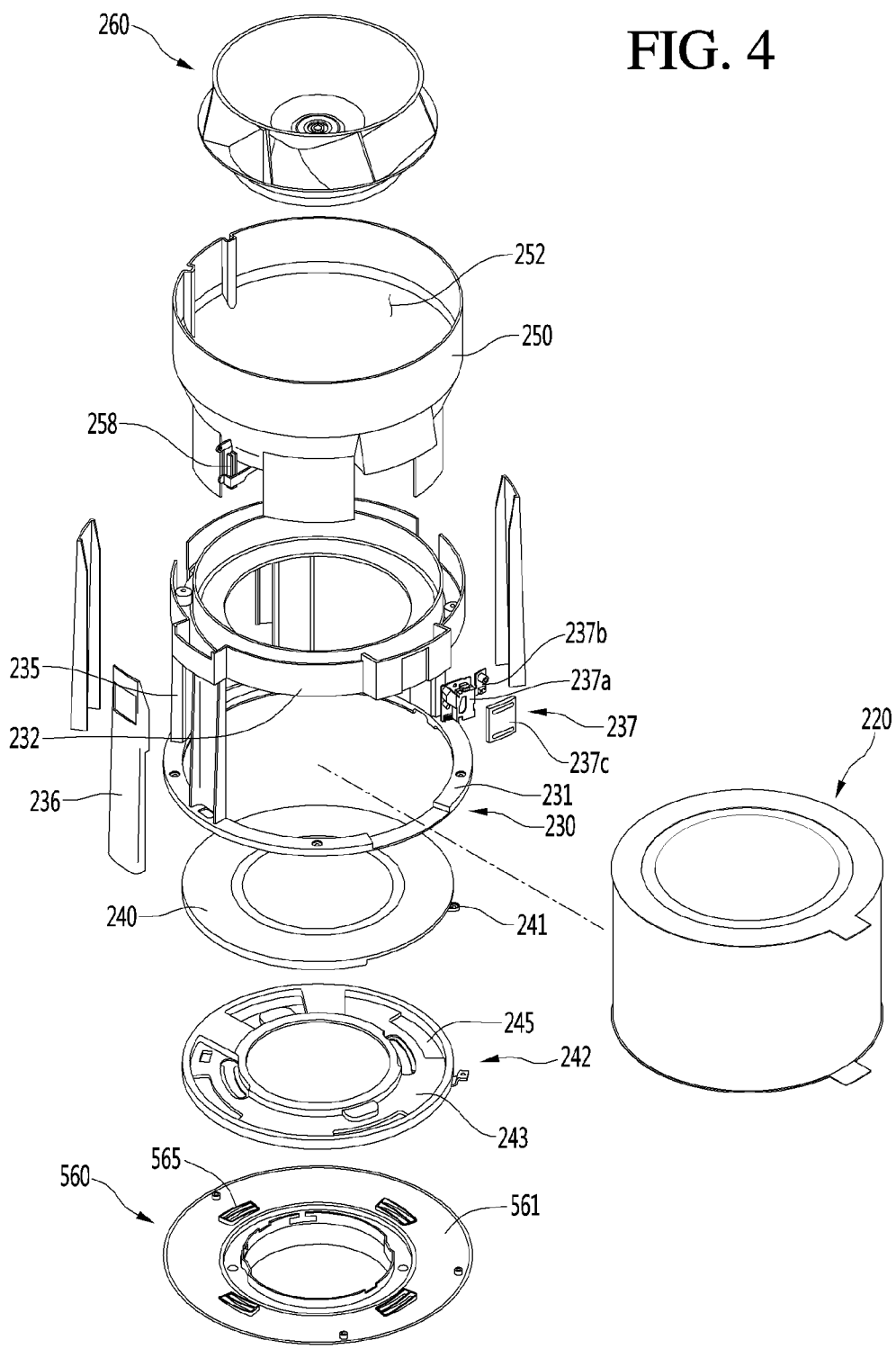
FIG. 4 is an exploded perspective view of a second blowing device of the air cleaner of FIG. 1.

FIG. 4 is an exploded perspective view of the second blowing device of the air conditioner of FIG. 1. Referring to FIG. 4, the second blowing device 200 according to this embodiment may include the lever supporting device 560, the lever device 242, the supporting device 240, the second filter 220, the second filter frame 230, a second fan housing 250, and a second fan 260.

The second filter 220 may have a cylindrical shape having an open upper portion. Air may be introduced to the inside of the second filter 220 through an outer circumferential surface of the second filter 220, and may be discharged through the open upper portion of the second filter 220. The second filter 220 may be the same or similar to the first filter 120, and thus, repetitive disclosure has been omitted.

The lever supporting device 560 may support the lever device 242. That is, the lever supporting device 560 may include a lever supporting main body 561 having an annular shape. The lever supporting main body 561 may be referred to as a "blocking portion" in that air which is discharged through the first discharge portion 105 of the first blowing device 100 may be blocked from being introduced to the second blowing device 200.

The lever supporting device 560 may further include a movement guide portion or guide 565 which may protrude from the lever supporting main body 561 in the upward direction. A plurality of movement guides 565 may be arranged spaced apart from one another in the circumferential direction of the lever supporting main body 561.

The lever device 242 may be operable by a user. For example, the lever device 242 may be rotatable in the circumferential direction. That is, the lever device 242 may include a lever main body 243 which may have a substantially ring shape and be rotatable. In addition, a plurality of cut-out portions or cut-outs 245, which may be disposed or provided at positions corresponding to the plurality of movement guides 565 may be formed in the lever main body 243.

The lever device 142 may be supported on an upper surface of the lever supporting main body 561. If the lever device 242 is supported by the lever supporting main body 561, the plurality of movement guides 565 may be inserted into the plurality of cut-out portions 245. That is, the plurality of movement guides 565 may protrude to an upper side of the plurality of cut-out portions 245 by passing through the plurality of cut-out portions 245.

A supporting device 240 that supports the second filter 220 may be provided on or at an upper side of the lever device 242. That is, the lever device 242 may support a lower surface of the supporting device 240. The supporting device 240 may include a support projecting portion or projection (not shown), which may be in contact with the movement guide 565. The support projecting portion may protrude in the downward direction from the lower surface of the supporting device 240, and may be provided at a position corresponding to the movement guide 565. In addition, a shape of the support projecting portion may correspond to a shape of the movement guide 565, and include an inclined surface which may gradually protrude in the circumferential direction. In addition, a direction in which the movement guide 565 gradually protrudes and a direction in which the support projecting portion gradually protrudes may be opposite to each other.

The lever device 242 and the supporting device 240 may rotate together. In the rotation process, the movement guide 565 and the support projecting portion may interfere with each other. That is, if a lower portion of the support projecting portion and an upper portion of the movement guide 565 are in contact with each other, the lever device 242 and the supporting device 240 may be lifted in the upward direction. In addition, the second filter 220 supported by the supporting device 240 may be in a state in which the second filter 220 is coupled to the second blowing device 200 while moving in the upward direction.

On the other hand, if the lower portion of the support projecting portion and the upper portion of the movement guide 565 are in contact with each other or if the inference between the support projecting portion and the movement guide 565 is released, the lever device 242 and the support-ing device 240 may move downward. In addition, the second filter 220 supported by the supporting device 240 may be in a state (released state) in which the second filter 220 is separable from the second blowing device 200.

The second blowing device 200 may further include a second filter frame 230, which may form a mounting space for the second filter 220. That is, the second filter frame 230 may include a first frame 231, which may form a lower portion of the second filter frame 230, a second frame 232, which may form an upper portion of the second filter frame 230, and a second filter supporting portion or support 235 that extends in the upward direction toward the second frame 232 from the first frame 231. The first and second frames 231 and 232 and the second filter supporting portion 235 may be the same or similar to the first and second frames 131 and 132 and the first filter supporting portion 135 of the first filter frame 130, and thus, repetitive disclosure has been omitted.

A mounting space for the second filter member 220 may be defined by the first and second frames 231 and 232 and the plurality of second filter supporting portions 235. In addition, a first supporting portion cover 236 may be coupled to an outside of the second filter supporting portion 235.

A sensor device 237 may be installed or provided in or on the second filter frame 230. The sensor device 237 may include a dust sensor 237a that senses an amount of dust in the air and a gas sensor 237b that senses an amount of gas in the air. The dust sensor 237a and the gas sensor 237b may be disposed or provided to be supported by the second frame 232 of the second filter frame 230. The sensor device 237 may include a sensor cover 237c that covers the dust sensor 237a and the gas sensor 237b.

In this embodiment, it has been described that the sensor device 237 may be installed or provided in the second blowing device 200. Alternatively, the sensor device 237 may be installed or provided in the first blowing device 100. That is, the sensor device 237 may be installed or provided in the first blowing device 100 or the second blowing device 200.

The second filter 220 may be detachably mounted on or in the mounting space. The second filter 220 may have a cylindrical shape and air may be introduced through an outer circumferential surface of the second filter 220. Impurities, such as fine dust in air, may be filtered in a process of passing through the second filter 220.

The second blowing device 200 may includes a second fan housing 250, which may be installed or provided on or at an outlet side of the second filter 220. A housing space portion or space 252, in which the second fan 260 may be accommodated, may be formed in the second fan housing 250. The second fan housing 250 and the second fan 260 may be the same or similar to the first fan housing 150 and the first fan 160, and therefore, repetitive disclosure has been omitted.

The second blowing device 200 may further include an ionizer 258 that removes or sterilizes smell particles in the air. The ionizer 258 may be coupled to the second fan housing 250 and may act the air which flows inside of the second fan housing 250. The ionizer 258 may be the same or similar to the ionizer of the first blowing device 100, and therefore, repetitive disclosure has been omitted.

Figure 5:
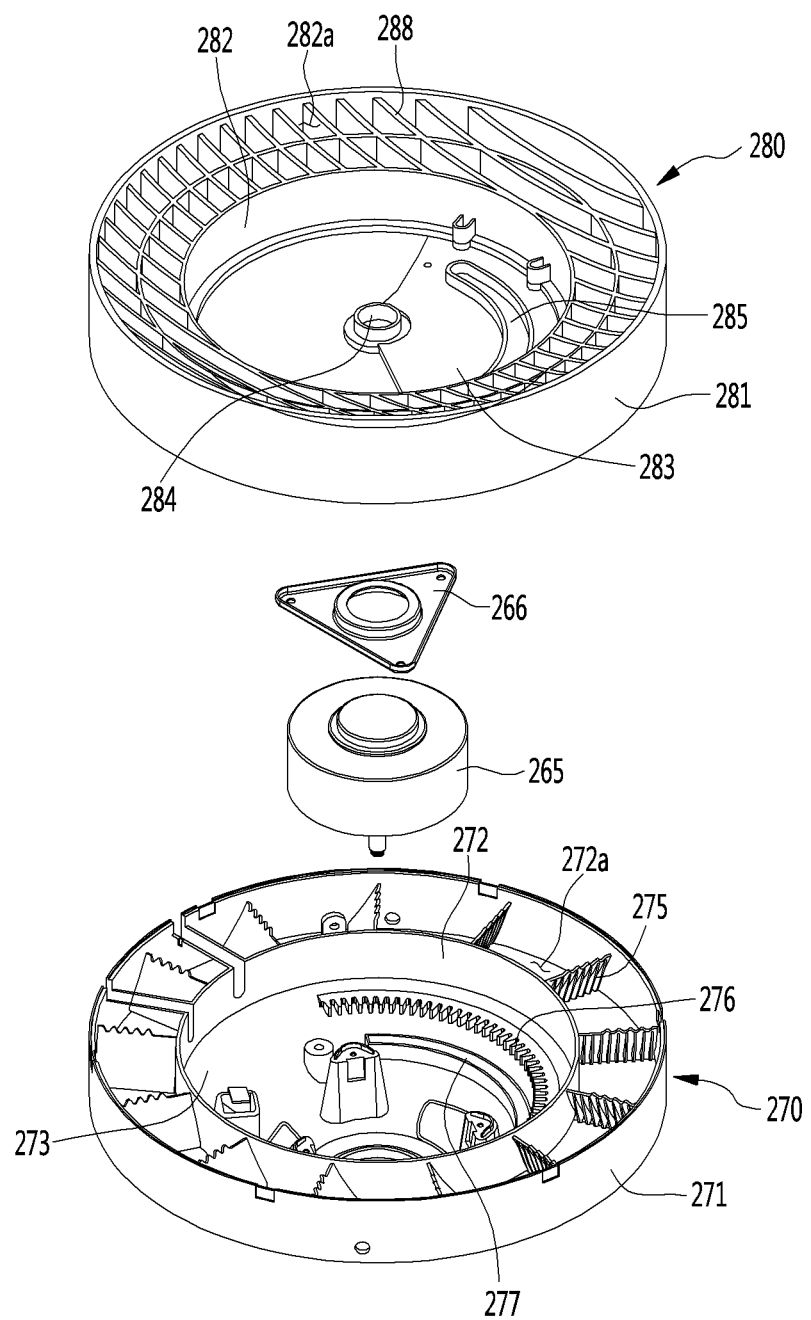
FIG. 5 is an exploded perspective view illustrating a third air guide and a second discharge guide of the air cleaner of FIG. 1.
Figure 6:
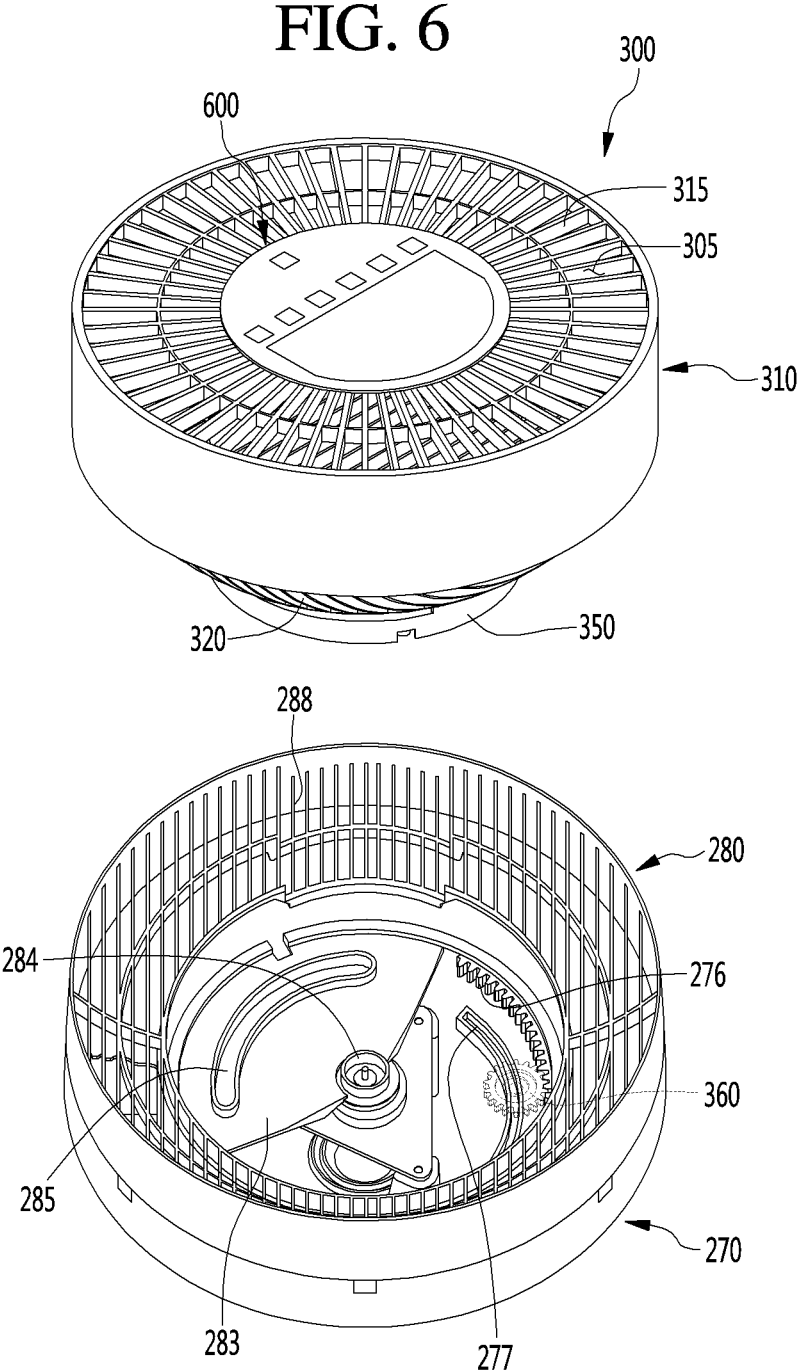
FIG. 6 is an exploded perspective view of an air flow control device and a component to which the air flow control device is coupled of the air cleaner of FIG. 1.
Figure 7:
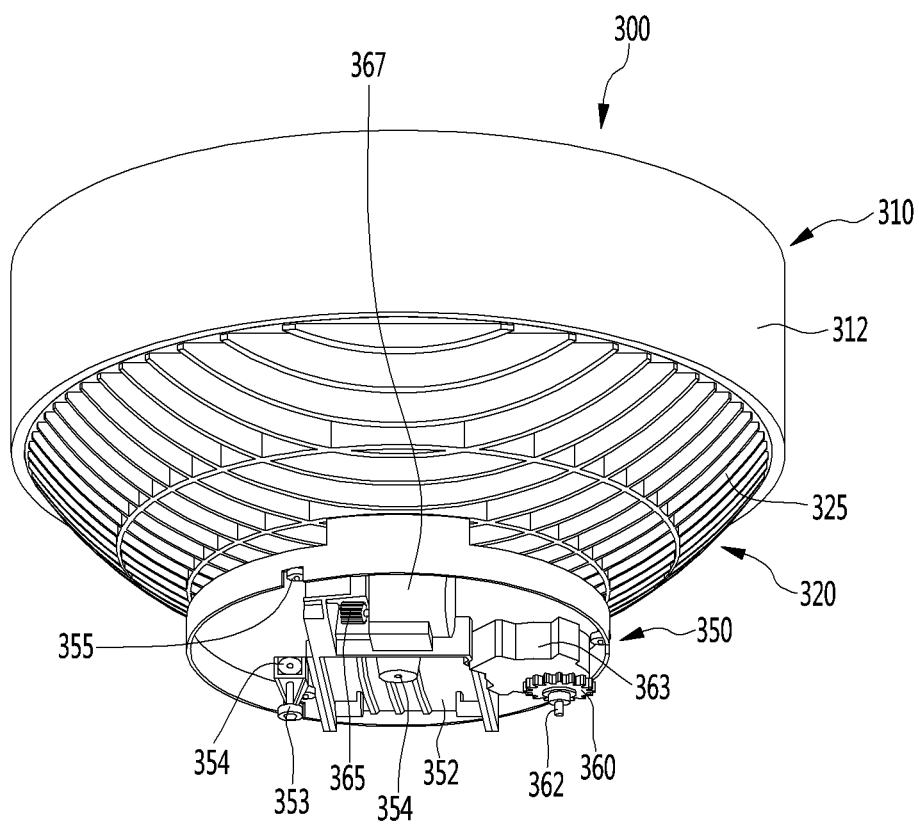
FIG. 7 is a perspective view illustrating a configuration of the air flow control device of FIG. 6.
Figure 8:
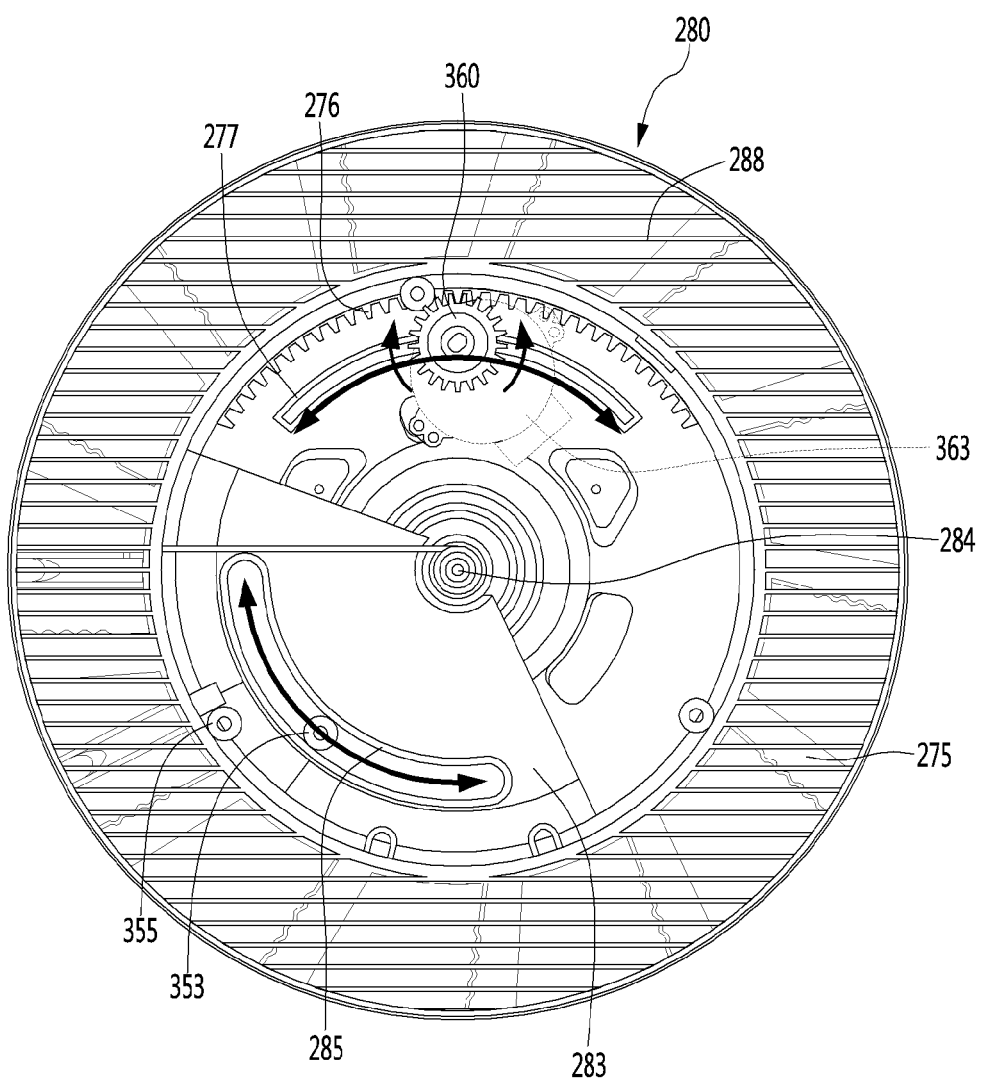
FIG. 8 is a view illustrating in a state in which a first guide acts to perform rotation of the air flow control device in a lateral direction according to an embodiment.

FIG. 5 is an exploded perspective view illustrating a third air guide and a second discharge guide of the air cleaner of FIG. 1. FIG. 6 is an exploded perspective view of an air flow control device and a component to which the air flow control device is coupled of the air cleaner of FIG. 1. FIG. 7 is a perspective view of the air flow control device of FIG. 6. FIG. 8 is a view illustrating in a state in which a first guide acts to perform rotation of the air flow control device in a lateral direction according to an embodiment.

Referring to FIGS. 5 to 8, the second blowing device 200 may include a third air guide device or guide 270 that guides a flow of air having passed through the second fan 260 by being coupled to an upper side of the second fan 260. The third air guide 270 may include an outer wall 271 that forms an outer circumferential surface of the third air guide 270 and an wall 272 positioned inside of the outer wall 271 and having a cylindrical shape. A first air flow path 272*a*, through which air may flow, may be formed between an inner circumferential surface of the outer wall 271 and an outer circumferential surface of the inner wall 272.

The third air guide 270 may include a guide rib 275 which may be disposed or provided on or in the first air flow path 272*a*. The guide rib 275 may extend from the outer circumferential surface of the inner wall 272 to the inner circumferential surface of the outer wall 271.

The third air guide 270 may include a motor accommodating portion 273 that extends from the inner wall 272 in the downward direction, and thus, accommodates the second fan motor 265. The motor accommodating portion 273 may have a bowl shape a diameter of which may be gradually reduced toward a lower side thereof.

The second fan motor 265 may be coupled to the upper side of the second fan 260, and thus, provide a drive force to the second fan 260. A motor coupling portion 266 may be provided on or at one side of the second fan motor 265, and the motor coupling portion 266 may fix the second fan motor 265 to the third air guide 270.

The third air guide 270 may include guide devices or guides 276 and 277 that guide a movement of the air flow control device 300. The guides 276 and 277 may include a first rack 276 and a shaft guide groove 277, which may be included in the motor accommodating portion 273.

The first rack 276 may be linked to the first gear 360 of the air flow control device 300. The first rack 276 may be provided on or at an inner circumferential surface of the motor accommodating portion 273 and may be provided along a set predetermined curvature in the circumferential direction. A length of the first rack 276 may be a length which is set based on a distance linked to the first gear 360.

The air flow control device 300 may be rotated in the lateral direction, that is, in the clockwise direction or in the counterclockwise direction. In this process, the first gear 360 may be rotated along a predetermined rotating radius about the rotational shaft 354 of the air flow control device 300.

The shaft guide groove 277 may be a groove that guides rotation of the first gear 260 and may extend rounded with a predetermined curvature. For example, the shaft guide groove 277 may be rounded in the circumferential direction. That is, the shaft guide groove 277 may have an arc shape.

The first gear shaft 362 of the first gear 360 may be inserted into the shaft guide groove 277. In a process of rotation of the first gear 360, the first gear shaft 360 may be moved along the shaft guide groove 277.

The second blowing device 200 may include a second discharge guide 280, which may be installed or at an on or at an upper side of the third air guide 270 and guide a flow of air which passed through the third air guide 270.

The second discharge guide 280 may have a substantially annular shape an inside portion of which may be empty. That is, the second discharge guide 280 may include a discharge outer wall 281 which may form an outer circumferential surface of the second discharge guide 280 and have a cylindrical shape and a discharge inner wall 282 which may form an inner circumferential surface of the second discharge guide 280 and have a cylindrical shape.

The discharge outer wall 281 may surround the discharge inner wall 282. A second air flow path 282*a*, that is, a discharge flow path along which air passing through the third air guide 270 may flow, may be formed between an inner circumferential surface of the discharge outer wall 281 and an outer circumferential surface of the discharge inner wall 282. The discharge flow path may be positioned on or at an upper side of the first air flow path in which the guide rib 275 is provided.

The second discharge guide 280 may include a second discharge grill 288, which may be disposed or provided on or in the discharge flow path. The second discharge grill 288, may extends from the outer circumferential surface of the discharge inner wall 282 to the inner circumferential surface of the discharging outer wall 281.

The second discharge guide 280 may further include a rotation guide plate 283, which may be coupled to the discharge inner wall 282. The rotation guide plate 283 may extend from the inner circumferential surface of the discharge inner wall 282 toward an inside center of the second discharge guide 280.

The rotation guide plate 283 may include a shaft inserting portion 284, which may provide a rotational center in the lateral direction of the air flow control device 300. The rotational shaft 354 may be inserted into the shaft inserting portion 284. The shaft inserting portion 284 may be positioned in the inside central portion of the second discharge guide 280. The rotation guide plate 283 may be a supporting plate that supports the shaft inserting portion 284.

A bearing groove 285 may be further included in the rotation guide plate 283. A first bearing 353, which may be provided on the air flow control device 300, may be inserted into the bearing groove 285. The bearing groove 285 may guide movement of the first bearing 353 and extend to be rounded with a predetermined curvature. For example, the bearing groove 285 may be rounded in the circumferential direction. That is, the bearing groove 285 may have an arc shape. In a process of rotation of the air flow control device 300 in the lateral direction, the first bearing 353 may be moved by inserted into the bearing groove 285, and thus, allows a friction force which is generated in the process of rotation of the air flow control device 300 to be reduced.

The air flow control device 300 may include a third fan housing 310, in which a third fan 330 may be accommodated. The third fan housing 310 may have a substantially annular shape. For convenience of description, the first fan 160 and the second fan 260 may be referred to as a "blowing fan," and the third fan 330 may be referred to as a "circulation fan."

A discharge grill 315, which may form the second discharge portion 305, through which air passing through the third fan 330 may be discharged, may be provided on or at an upper side of the third fan housing 310. As the air cleaner 10 may include the second discharge portion 305 together with the first discharge portion 105 of the first blowing device 100, a discharge amount of air may be improved, and air may be discharged in various directions. In addition, the display device 600 may be provided at a center portion of the discharge grill 315.

An axial flow fan may be included in the third fan 330. That is, the third fan 330 may be operated in order to axially discharge air which is axially introduced. That is, the air which flows toward the third fan 330 in the upward direction via the second fan 260, the first air flow path 272*a* of the third air guide 270, and the discharge flow path 282a of the second discharge guide 280 may be discharged from the third fan 330, and thus, may be discharged to the outside through the second discharge portion 305, which may be positioned on the upper side of the third fan 330.

The third fan 330 may include a hub 331 having a shaft coupling portion to which a rotational shaft of the third fan motor 335, which is the axial flow motor may be coupled, and a plurality of blades 333 which may be coupled to the hub 331 in the circumferential direction. The third fan motor 335 may be coupled to a lower side of the third fan 330 and may be disposed or provided inside of the third motor housing 337.

The first fan motor 165 and the second fan motor 265 may be disposed or provided in series relative to a longitudinal direction of the air cleaner 10. The second fan motor 265 and the third fan motor 335 may be disposed or provided in series relative to the longitudinal direction of the air cleaner 10. In summary, rotational shafts of the first fan motor 165, the second fan motor 265, and the third fan motor 335, or the first fan 160, the second fan 260, and the third fan 330 may be positioned on a same axis in a longitudinal direction.

The air flow control device 300 may include a flow guide portion or guide 320 which may be coupled to a lower side of the third fan housing 310, and thus, guide the air passing by the second discharge guide 280 to the third fan housing 310. The flow guide 320 may include an introduction grill 325 that guides the air introduction to the third fan housing 310. The introduction grill 325 may have a concave shape in the downward direction.

A shape of the second discharge grill 288 of the second discharge guide 280 may be formed in a concave shape in the downward direction corresponding to a shape of the introduction grill 325. The introduction grill 325 may be seated on an upper side of the second discharge grill 288. By this configuration, the introduction grill 325 may be stably supported by the second discharge grill 288.

The air flow control device 300 may further include a rotation guide device or guide 350, which is installed or provided on or at a lower side of the flow guide 320, and thus, may guide rotation in the lateral direction and rotation in the vertical direction of the air flow control device 300. The rotation in the lateral direction may be referred to as a "first direction rotation" and the rotation in the vertical direction may be referred to as a "second direction rotation."

The rotation guide device 350 may include a first guide mechanism or guide, which may guide the first direction rotation of the air flow control device 300, and a second guide mechanism or guide, which may guide the second direction rotation of the air flow control device 300. The first guide may include a first gear motor 363 that generates a drive force and a first gear 360 coupled to the first gear motor 363 to be rotatable. For example, the first gear motor 363 may include a step motor, a rotation angle of which may be controlled.

The first gear 360 may be coupled to the motor shaft 363a of the first gear motor 363. The first guide may include a first gear shaft 362, which may extend from the first gear 360 in the downward direction, that is, toward the third air guide 270 or the second discharge guide 280.

The first gear 360 may be geared to the first rack 276 of the third air guide 270. A plurality of gear teeth may be formed in the first gear 360 and the first rack 276. When the first gear motor 363 is driven, the first gear 360 may rotate, and thus, links to the first rack 276. The third air guide 270 may be fixed, and thus, the first gear 360 may be movable.

The shaft guide groove 277 of the third air guide 270 may guide movement of the first gear 360. That is, the first gear shaft 362 may be inserted into the shaft guide groove 277. The first gear shaft 362 may be moved along the shaft guide groove 277 in a rotation process of the first gear 360.

The first guide may include the rotational shaft 354, which may form a rotational center of the air flow control device 300. The first gear 360 and the first gear shaft 362 may be rotated along a rotating radius which may be set about the rotational shaft 354. The set rotating radius may be referred to as a "first rotating radius."

The rotational shaft 354 may be provided on a lower surface of the rotation guide 350 and inserted into a shaft inserting portion 284 of the second discharge guide 280, and may be rotated in the shaft inserting portion 284. That is, when the first gear 360 rotates, the first gear shaft 362 and the first gear 360 rotate about the rotational shaft 354 in the circumferential direction. The rotational shaft 354 rotates in the shaft inserting portion 284. Accordingly, the air flow control device 300 may be rotated in a first direction, that is, in the clockwise direction or in the counterclockwise direction about a longitudinal direction as the axial direction.

The first guide may further include bearings 353, and 355 that easily rotate the air flow control device 300 in the first direction. The bearings 353, 355 may reduce a friction force generated in the rotational process of the air flow control device 300.

The bearings 353 and 355 may include a first bearing 353 provided on a lower surface of the rotation guide 350. For example, the first bearing 353 may be included a ball bearing.

The rotation guiding plate 283 may include a bearing groove 285, into which the first bearing 353 may be inserted. In a process of rotation of the air flow control device 300 in the first direction, the first bearing 353 may be movable with the first bearing being inserted into the bearing groove 285. The first bearing 353 may be rotated along a rotating radius which is set about the rotational shaft 354. That is, the set rotating radius may be referred to as a "second rotating radius". The second rotating radius may be less than the first rotating radius.

The bearings 353 and 355 may include a second bearing 355. The second bearing 355 may be rotatably installed or provided at the rim portion or rim 351b. The second bearing 355 may be in contact with the discharge inner wall 282 of the second discharge guide 280, that is, an inner circumferential surface of the discharge inner wall 282 may form the contacting surface of the second bearing 355. The air flow control device 300 may be easily rotated in the first direction by the second bearing 355 rotating about the rotational shaft 354 along the inner circumferential surface of the discharge inner wall 282.

The first direction rotation of the air flow control device 300 will be briefly described with reference to FIG. 8. If the first gear motor 363 is operated, the first gear 360 may be rotated. When viewed from a top, the first gear motor 363 may be rotated in the clockwise direction or the counterclockwise direction. Accordingly, the first gear 360 may be rotated in the clockwise direction or the counterclockwise direction.

For example, if the first gear motor 363 is rotated in the clockwise direction, the first gear 360 and the first gear shaft 362 may be moved in the counterclockwise direction along the shaft guide groove 277. On the other hand, if the first gear motor 363 is rotated in the counterclockwise direction, the first gear 360 and the first gear shaft 362 may be moved in the clockwise direction along the shaft guide groove 277.

As the first gear 360 is moved in the clockwise direction or in the counterclockwise direction, the air flow control device 300 may be rotated in the same direction as the movement direction of the first gear 360. In this process, the first bearing 353 may be moved along the bearing groove 285, and the second bearing 355 may be moved along the inner circumferential surface of the discharge inner wall 282. Accordingly, the air flow control device 300 may be stably rotated along a set flow path in the lateral direction.

Figure 9:
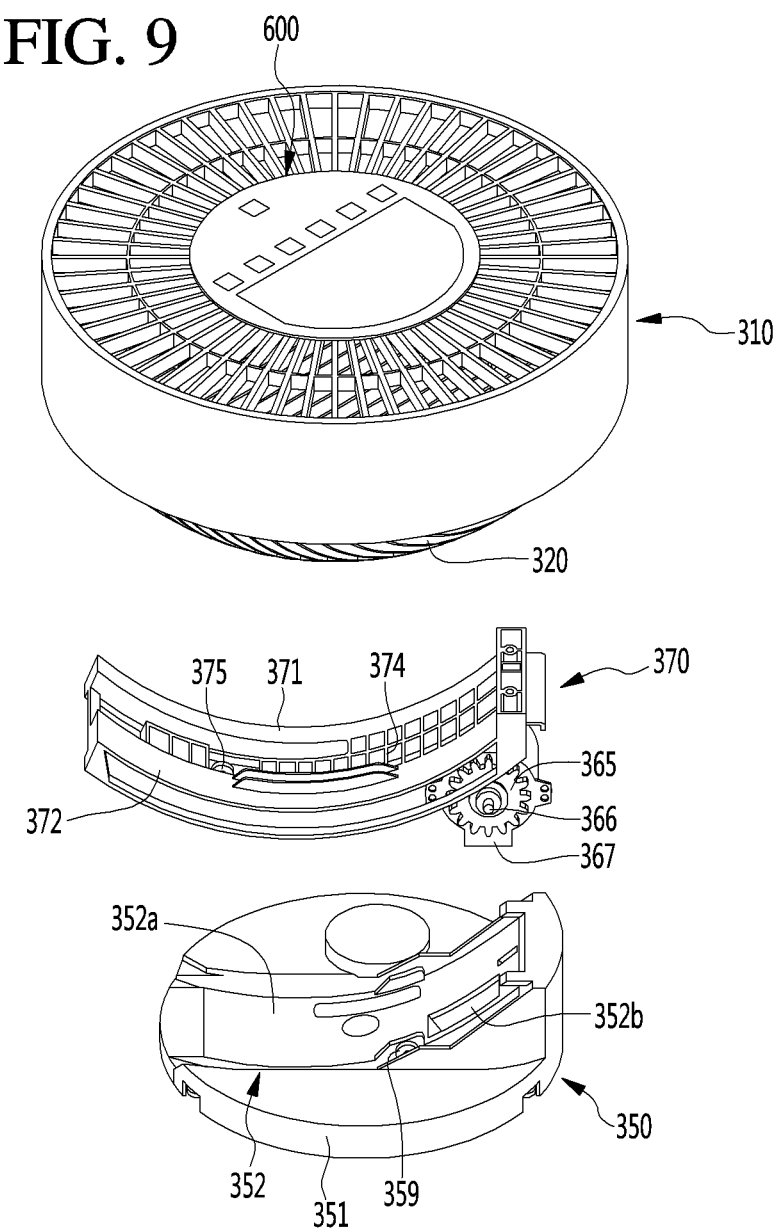
FIG. 9 is an exploded perspective view of the air flow control device according to an embodiment.
Figure 10:
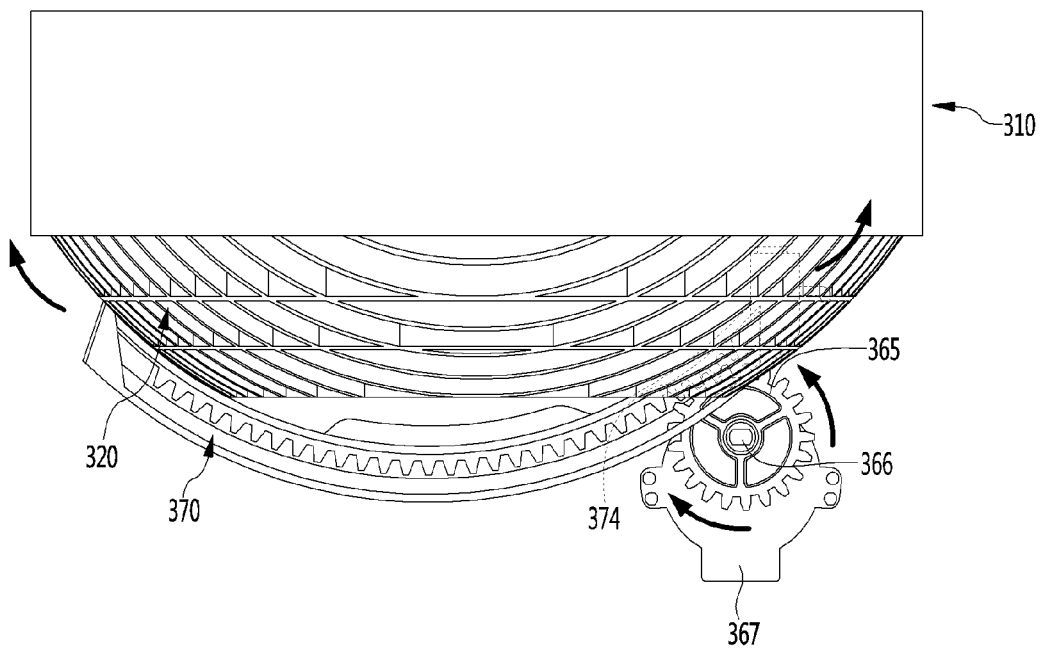
FIG. 10 is a view illustrating a state in which a second guide acts to perform rotation of the air flow control device in the lateral direction according to an embodiment.

FIG. 9 is an exploded perspective view of the air flow control device according to an embodiment. FIG. 10 is a view illustrating a state in which a second guide acts to perform rotation of the air flow control device in a lateral direction according to an embodiment.

Referring to FIGS. 7 to 9, the air flow control device 300 according to an embodiment may include a second guide mechanism or guide that guides rotation in the vertical direction of the air flow control device 300. The second guide may include a fixing guide member or guide 352, which may be fixed to the guide main body 351. The rotational shaft 354 may be provided in a lower surface of the fixing guide 352.

The fixing guide 352 may support a lower side of the rotation guide 370, and include a first guide surface 352a, which may guide the second direction rotation of the rotation guide 370. The first guide surface 352a may form at least a portion of an upper surface of the fixing guide 352, and may extend rounded in the upward direction, corresponding to a rotational path of the rotation guide 370.

The fixing guide 352 may further include a first guide bearing 359 which may reduce a friction force generated at a time of rotating movement of the rotation guide 370 by being in contact with the rotation guide 370. The first guide bearing 359 may be positioned to or at a side of the first guide surface 352a.

The fixed guide 352 may further include a second gear inserting portion 352b, into which the second gear 365 may be inserted for rotation of the rotation guide 370. The second gear inserting portion 352b may be formed on or at one side of the first guide surface 352a. For example, the second gear inserting portion 352b may have a shape of at least a portion of the first guide surface 352a being cut.

The second gear 365 may be positioned to or at a lower side of the first guide surface 352a and at least a portion of the second gear 365 may project to an upper side of the second gear inserting portion 352b through the second gear inserting portion 352b.

The second guide may include a second gear motor 367 which couples to the second gear 365 and provides a drive force. For example, the second gear motor 367 may include a step motor. The second guide may further include a second gear shaft 366 that extends from the second gear motor 367 to the second gear 365. When the second gear motor 367 is driven, the second gear shaft 366 and the second gear 365 may be rotated together.

The second guide may further include a rotation guide 370, which may be provided on or at an upper side of the fixing guide 352. The rotation guide member 370 may be coupled to a lower side of flow guide 320.

That is, the rotation guide 370 may include a main body portion or body 371, which may be supported by the fixing guide 352. The main body portion 371 may include a second guide surface 372 which moves along the first guide surface 352a. The second guide surface 372 may be rounded corresponding to a curvature of the first guide surface 352a.

The rotation guide 370 may further include a second guide bearing 375 which is capable of reducing a friction force generated at a time of rotating movement of the rotation guide 370 by being in contact with the fixing guide 352. The second guide bearing 375 may be positioned on or at a side of the second guide surface 372.

The rotation guiding 370 may include a second rack 374 linked to the second gear 365. A plurality of gear teeth may be formed in the second gear 365 and the second rack 374, and the second gear 365 and the second rack 374 may be geared to each other through the plurality of gear teeth.

If the second gear motor 367 is driven, the rotation guide 370 rotates in the vertical direction by linkage of the second gear 365 and the second rack 374. Accordingly, the air flow control device 300 may perform the second direction rotation according to the movement of the rotation guide 370.

The second direction rotation of the air flow control device 300 will be described with reference to FIG. 10.

If the second gear motor 367 is operated, the second gear 365 may be rotated. The second gear motor 367 may be rotated in the clockwise direction or in the counterclockwise direction relative to the radial direction. Accordingly, the second gear 365 may be rotated in the clockwise direction or in the counterclockwise direction.

For example, if the second gear motor 367 is rotated in the clockwise direction, the second gear 365 is rotated in the clockwise direction, and the second rack 374 is rotated in the counterclockwise direction by linkage with the second gear 365. As the second rack 374 is rotated, the rotation guide 370 and the flow guide 320 may be rotated together. Finally, the fan housing 310 may be rotated in the counterclockwise direction.

On the other hand, if the second gear motor 367 is rotated in the counterclockwise direction, the second gear 365 may be rotated in the counterclockwise direction, and the second rack 374 is rotated in the clockwise direction by linkage with the second gear 365. As the second rack 374 is rotated, the rotation guide 370 and the flow guide 320 are rotated together. Finally, the fan housing 310 may be rotated in the clockwise direction. Accordingly, the air flow control device 300 may be stably rotated along a set path in the vertical direction.

Figure 11:
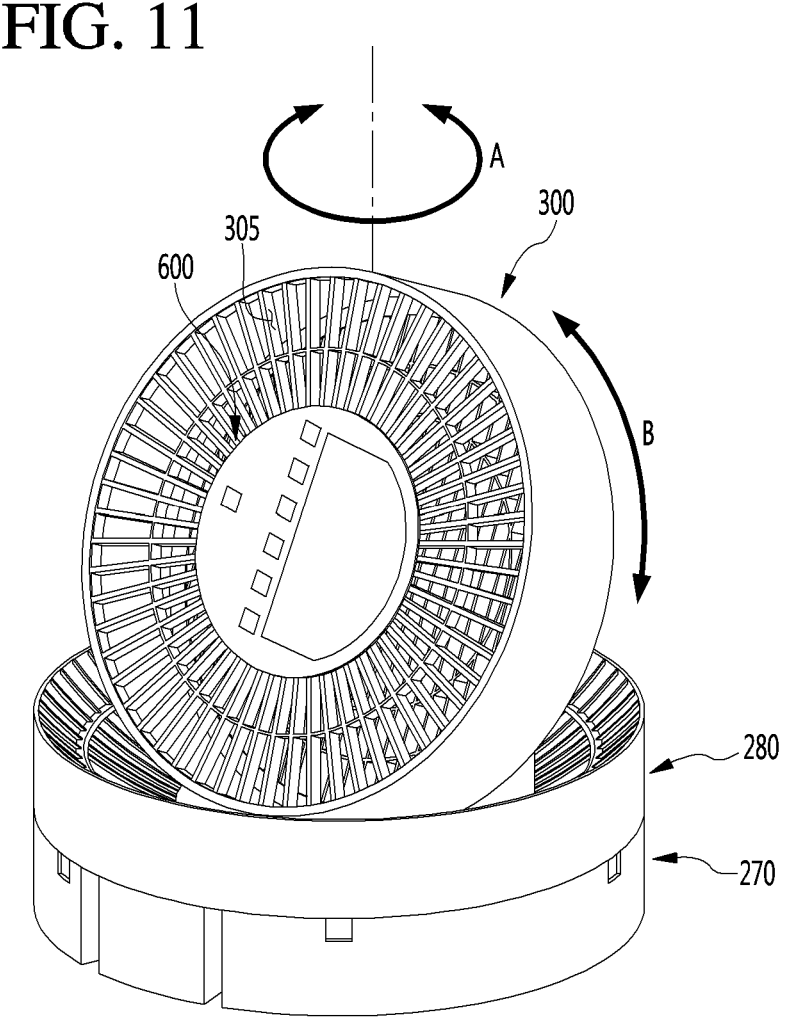
FIG. 11 is a view illustrating a state in which the air flow control device is located at a second position according to an embodiment.
Figure 12:
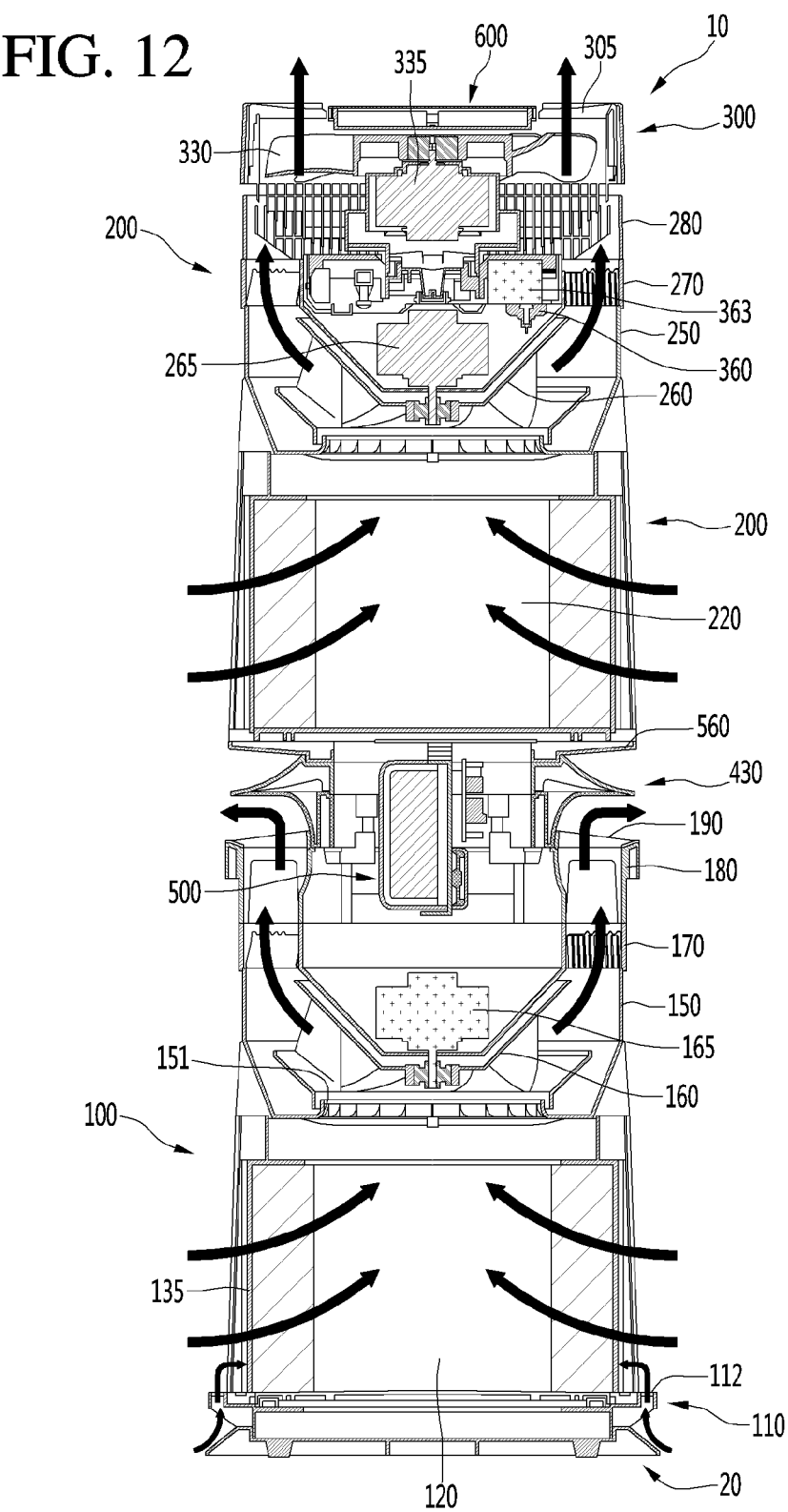
FIG. 12 is a view illustrating air flow through the air cleaner when the air flow control device is located at the first position according to an embodiment.

FIG. 11 is a view illustrating a state in which the air flow control device is located at a second position according to an embodiment. FIG. 12 is a view illustrating air flow through the air cleaner when the air flow control device is located at the first position according to an embodiment. FIG. 13 is a view illustrating air flow through the air cleaner when the air flow control device is located at the second position according to an embodiment.

FIG. 11 illustrates a state in which the air flow control device 300 protrudes to the upper side of the second discharge guide 280, that is, a state (second position) in which the fan housing 310 is inclined in the upward direction as the rotation guide 370 is rotated in the upward direction.

As the air flow control device 300 is vertically rotated in a direction of "B" shown in FIG. 11, the air flow control device 300 may be moved to the first position (see FIG. 1) or the second position. When the air flow control device 300 is located at the first position, the introduction grill 325 is disposed on the upper surface of the second discharge grill 288. On the other hand, when the air flow control device 300 is located at the second position, the introduction grill 325 is spaced apart from the upper surface of the second discharge grill 288 in the upward direction.

The third fan 330 may be selectively operated based on whether the air flow control device 300 is located at the first position or the second position. That is, referring to FIG. 12, the first and second fans 160 and 260 may be rotated to generate air flow in the state in which the air flow control device 300 is located at the first position. Air suction and discharging (first flow) at a lower portion of the air cleaner 10 may be generated by the operation of the first fan 160. In addition, air suction and discharging (second flow) at an upper portion of the air cleaner 10 may be generated by the operation of the second fan 260. The first flow and the second flow may be separated from each other by the dividing device 400.

In addition, the third fan 330 may be selectively operated. If the third fan 330 is operated, the second flow may be more strongly generated. In other words, a strong discharge air current at the upper portion of the air cleaner 10 may be generated by the second fan 260 and the third fan 330, and may be discharged through the second discharge portion 305. The third fan 330 may not be operated.

In the state in which the air flow control device 300 is located at the second position, the first and second fans 160 and 260 may be rotated to generate the first flow and the second flow. In addition, the third fan 330 may be operated. The second position is a position in which the airflow control device 300 is inclined by a set angle in the upward direction, relative to the first position of the air flow control device 300. For example, the set angle may be about 60 degrees.

That is, referring to FIG. 13, by the operation of the third fan 330, at least a portion of air which is discharged through the second discharge guide 280 may be introduced to the inside portion of the third fan housing 310, and may be discharged from the second discharge portion 305 via the third fan 330. Accordingly, purified air may reach a position distant from the air cleaner 10.

In the state in which the air flow control device 300 is located at the second position, the air flow control device 300 may be rotated in the lateral direction, relative to the side direction. FIG. 11 illustrates a state in which the air flow control device 300 is located to face in one direction (left direction relative to FIG. 11) in the state in which the air flow control device 30 is located at the second position. The one direction may be a direction which faces at 45 degrees to a left or first side, relative to the front of the air cleaner 10.

The air flow control device 300 may be located to face in another direction in the state in which the air flow control device 300 is located at the second position. The other direction may be a face which faces at 45 degrees at a right or second side, relative to the front of the air cleaner 10. In other words, the rotation angle of the air flow control device 300 may be about 90 degrees.

As described above, the air flow control device 300 may rotated in the lateral direction relative to the axial direction, and thus, discharge air current may be blown long distance in various directions, relative to the air cleaner 10.

Figure 14:
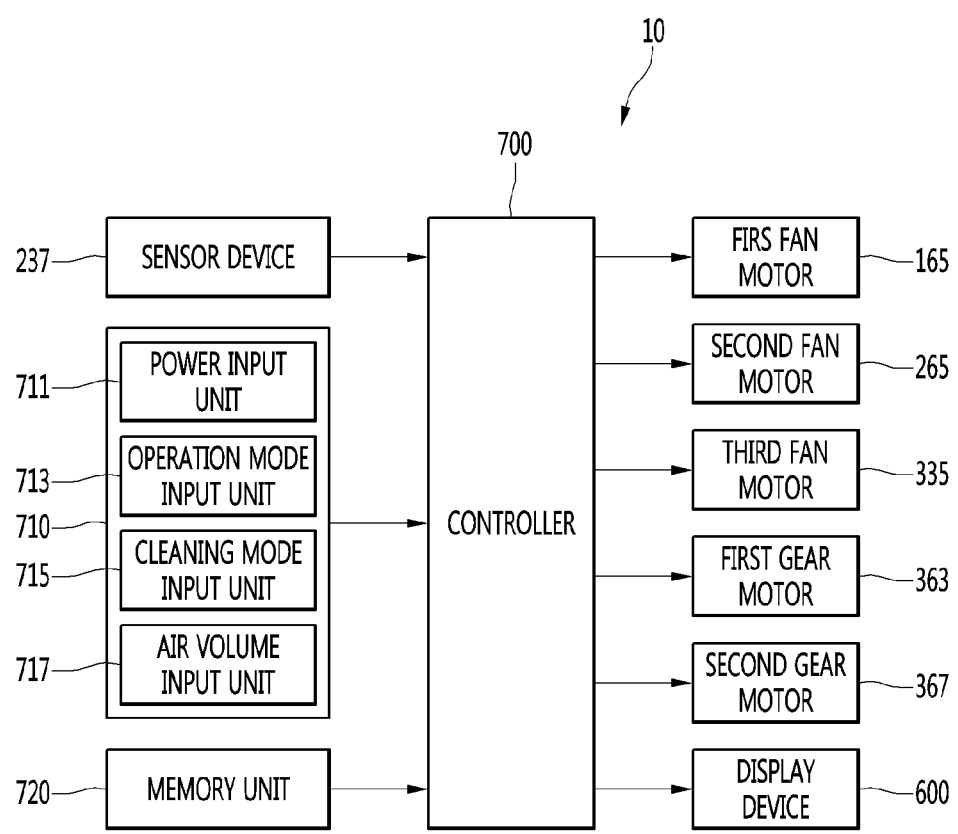
FIG. 14 is a block diagram of a control configuration of the air cleaner according to an embodiment.
Figure 15:
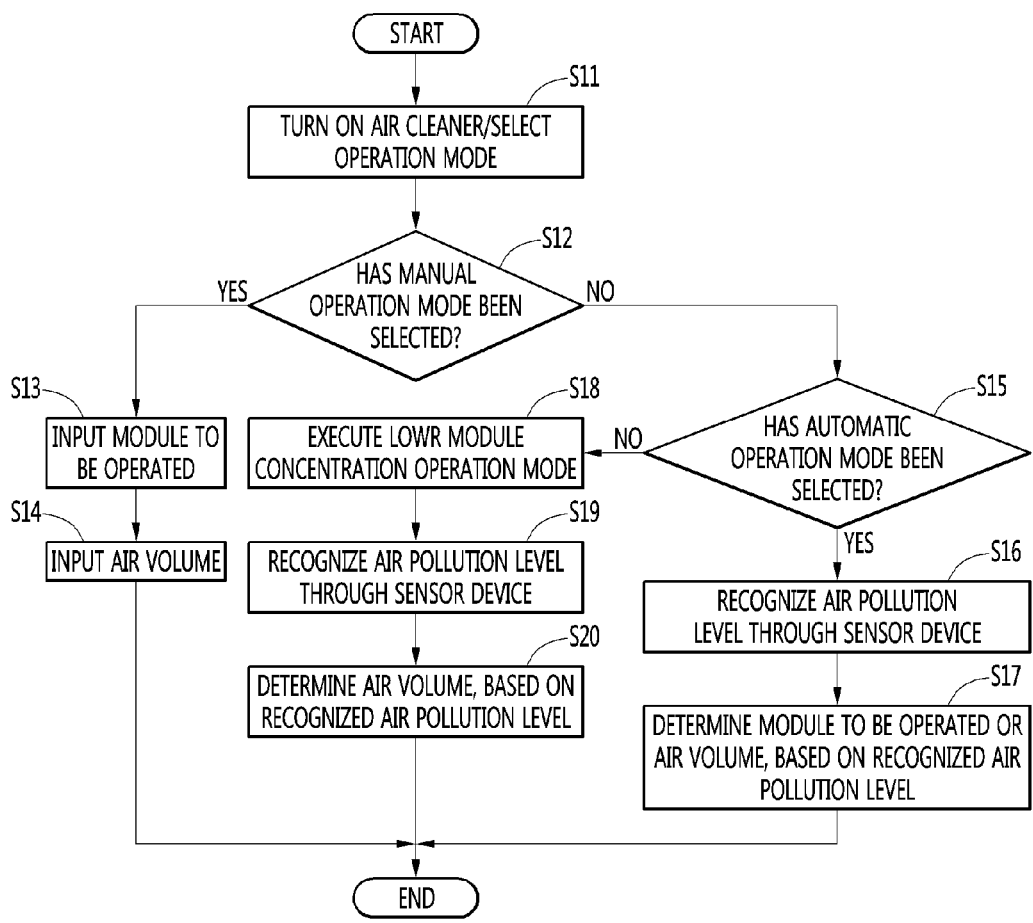
FIG. 15 is a flowchart a method for controlling an air cleaner according to an embodiment.

FIG. 14 is a block diagram of a control configuration of the air cleaner according to an embodiment. FIG. 15 is a flowchart of a method for controlling the air cleaner according to an embodiment.

Referring to FIG. 14, the air cleaner 10 according to an embodiment includes the sensor device 237. The sensor device 237 may include the dust sensor 237a. The dust sensor 237a may sense an amount of impurity or dust, which may have a set or predetermined size, in air suctioned in to the upper module 200. For example, the dust sensor 237a may be configured to sense an amount of ultrafine dust having a size of 2.5 μm or less. Therefore, the dust sensor 237a may be referred to as a "PM2.5 dust sensor."

The sensor device 237 may further include the gas sensor 237b. The gas sensor 237b may sense an amount of poisonous gas, for example, combustible gas, reductive gas, or organic solvent gas, which may be contained in air suctioned into the upper module 200.

TABLE 1

|  | Air quality level | | | | | | |
| --- | --- | --- | --- | --- | --- | --- | --- |
|  | 1 | 2 | 3 | 4 | 5 | 6 | 7 |
| Pollution level (cleanliness) | Good | | Normal | | Bad | | Very Bad |
| Display color | Green | | Yellow | | Orange | | Red |

An air state, that is, an air quality level may be determined based on information sensed by the dust sensor 237a and the gas sensor 237b. That is, the air quality level may be determined by combining values which are output from the dust sensor 237a and the gas sensor 237b. For example, the air quality level may be divided into level 1 to level 7, and it may be recognized that, as the level increases, an air state becomes worse or declines.

In addition, it may be recognized that the air pollution level (cleanliness) is in a "good state" in a section in which the air quality level is 1 to 2, the air pollution level (cleanliness) is in a "normal state" in a section in which the air quality level is 3 to 4, the air pollution level (cleanliness) is in a "bad state" in a section in which the air quality level is 5 to 6, and the air pollution level (cleanliness) is in a "very bad state" in a section in which the air quality level is 7.

Level information on the air pollution level may be displayed on the display device 600. For example, the information on the air pollution level may be displayed using color. That is, if it is recognized that the air pollution level is in the "good state," the display device 600 may output "green color." If it is recognized that the air pollution level is in the "normal state," the display device 600 may output a "yellow color." If it is recognized that the air pollution level is in the "bad state," the display device 600 may output an "orange color." If it is recognized that the air pollution level is in the "very bad state," the display device 600 may output a "red color." As described above, the information on the air pollution level may be displayed as a distinguishable color, so that a user may intuitively recognize information on air quality.

The air cleaner 10 may include an input unit or input 710, through which a user may input a predetermined command. The input unit 710 may include a power input unit or input 711 which is capable of turning on or off power of the air cleaner 10.

The input unit 710 may further include an operation mode input unit or input 713, which is capable of receiving input of a command for operation modes of the air cleaner 10 in a state in which the power of the air cleaner 10 is turned on. The operation modes of the air cleaner 10 may include a manual operation mode, an automatic operation mode, and a lower module concentration operation mode, for example. The user may select, through the operation mode input unit 713, any one operation mode among the manual operation mode, the automatic operation mode, and the lower module concentration operation mode. For example, the operation mode input unit 713 may include a separate input unit or input, which is capable of receiving selection of each operation mode.

When the manual operation mode is selected through the operation mode input unit 713, the user may input a number of modules (devices) to be operated or an air strength (air volume). That is, the input unit 710 may further include a cleaning mode input unit or input 715 which determines a number of modules to be operated. The modules may include three modules, that is, the first air cleaning module 100, the second air cleaning module 200, and the air flow control device 300. The three modules may be selectively or independently operated.

The cleaning mode input unit 715 may determine a number of modules to be operated. That is, the cleaning mode input unit 715 may include a "single cleaning input," a "dual cleaning input," and a "circulation cleaning input." The single cleaning input is may be an input which is capable of being input to operate the first air cleaning module 100 among the three modules, and the dual cleaning input may be an input which is capable of being input to operate the first and second air cleaning modules 100 and 200. In addition, the circulation cleaning input may be an input which is capable of being input to operate the first and second air cleaning modules 100 and 200 and the air flow control device 300.

If the single cleaning input is input, the air cleaner 10 may be operated in a "single mode" in which independent operation of the lower module 100 may be performed. If the dual cleaning input is input, the air cleaner 10 may be operated in a "dual mode" in which a combination operation of the upper and lower modules 100 and 200 may be performed. In addition, if the circulation cleaning input is input, the air cleaner 10 may be operated in a "circulation mode" in which a combination operation of the upper and lower modules 100 and 200 and the air flow control device 300 may be performed.

The input unit 710 further includes an air volume input unit or input 717, which may determine an air strength of air discharged from the module to be operated, that is, an air volume. The user may determine a module to be operated through the cleaning mode input unit 715 and then determine an air volume of air discharged from the corresponding module through the air volume input unit 717. For example, the air volume may be divided into "weak air," "moderate air," and "strong air." It will be apparent that a rotation number of the first fan 160, the second fan 260, or the third fan 330 may be determined based on the determined air volume.

When the automatic operation mode is selected through the operation mode input unit 713, the air cleaner 10 may determine the number of modules to be operated and the air strength (air volume), based on the air pollution level recognized by the sensor device 237. For example, when the air pollution level is in the "good state" or "normal state," it may be determined that the first air cleaning module 100 among the modules is to be operated. When the air pollution level is in the "bad state," it may be determined that the first and second air cleaning modules 100 and 200 among the modules is to be operated.

The air pollution level of the "normal state", that is, the air quality of level 4 may be a first reference pollution level at which only the first air cleaning module 100 is operable. In addition, the air pollution level of the "bad state", that is, the air quality of level 6 may be a second reference pollution level at which the first and second air cleaning modules 100 and 200 are operable. In other words, when the pollution level is equal to or higher than the first reference pollution level and equal to or less than the second reference pollution level, the first and second air cleaning modules 100 and 200 may be operated.

At the pollution lever which is equal to or higher than the second reference pollution level, all of the three modules may be operated. That is, when the air pollution level is in the "very bad state," it may be determined that all of the three modules, that is, the first and second air cleaning modules 100 and 200 and the air flow control device 300 are to be operated. When it is determined that the air flow control device 300 is to be operated, the air flow control device 300 may be moved to the second position (see FIG. 13) to be operated.

If a module to be operated is determined based on the information on the air pollution level, the air volume of air discharged from the module to be operated may be preset or predetermined. For example, the preset air volume may be "weak air."

If an air volume is input from the air volume input unit 717 in a process in which a predetermined module is operated with the "weak air" through the automatic operation mode, the air volume of air discharged from the module to be operated may be controlled based on preset or predetermined information. The reason why the user inputs the air volume through the air volume input unit 717 is that it may be recognized that the user desires a stronger air volume.

For example, when the air pollution level is in the "good state," the air cleaning level may be satisfactorily maintained even when the first air cleaning module 100 is operated with the "weak air," and therefore, the air volume of the first air cleaning module 100 may not be changed. In addition, a guide message may be output to the user through the display device 600. For example, the guide message may include "air state is satisfactory, and cleaning state is capable of being maintained through only current operation." Nevertheless, when the user requests a strong air, the display device 600 may guide a change to the "manual operation mode."

When the air pollution level is in the "normal state," the air volume of the first air cleaning module 100 may be controlled to the "moderate air." In addition, a message notifying that the air volume of the first air cleaning module 100 has been controlled from the "weak air" to the "moderate air" may be output to the user.

When the air pollution level is in the "bad state," the air volume of each of the first and second air cleaning modules 100 and 200 may be controlled to the "moderate air." In addition, a message notifying that the air volume of each of the first and second air cleaning modules 100 and 200 has been controlled from the "weak air" to the "moderate air" may be output to the user.

When the air pollution level is in the "very bad state," the air volume of each of the first and second air cleaning modules 100 and 200 and the air flow control device 300 may be controlled to the "strong air." In addition, a message notifying that the air volume of each of the first and second air cleaning modules 100 and 200 and the air flow control device 300 has been controlled from the "weak air" to the "strong air" may be output to the user.

When the lower module concentration operation mode is selected through the operation mode input unit 713, an air volume of the first air cleaning module 100 may be determined based on the air pollution level recognized by the sensor device 237, and an operation of the first air cleaning module 100 may be performed based on the determined air volume. If the lower module concentration operation mode is selected, the air cleaner 10 may first clean a lower area of a cleaning space having a relatively high pollution level while consuming relatively low power. In particular, when a child or baby a respiratory function of which is weak is present in the lower area of the cleaning space, the effect of the lower module concentration operation mode may be more remarkable. The lower module concentration operation mode may be referred to as a "baby care mode".

It may be determined that, as the pollution level sensed by the sensor device 237 increases, the air volume of air discharged from the first air cleaning module 100 increases. For example, when the air pollution level is in the "good state" or "bad state," the air volume of the first air cleaning module 100 may be determined as the "weak air." When the air pollution level is in the "bad state," the air volume of the first air cleaning module 100 may be determined as the "moderate air." In addition, when the air pollution level is in the "very bad state," the air volume of the first air cleaning module 100 may be determined as the "strong air."

Accordingly, a number (kind) of modules to be operated or the air volume may be differently controlled even at the same air pollution level, based on whether the user has selected the automatic operation mode or the lower module concentration operation mode. For example, if the automatic operation mode is selected when the air pollution level is within a range of a reference pollution level, that is, in the "bad state," a controller 700 may control each of the first and second air cleaning modules 100 and 200 to discharge a first air volume. On the other hand, if the lower module concentration operation mode is selected when the air pollution level is within the range of the reference pollution level, for example, in the "bad state," the controller 700 may control the first air cleaning module 100 to discharge a second air volume. The second air volume may be greater than the first air volume. According to this control, an operation suitable for the user may be performed.

The air cleaner 10 may include a memory unit or memory 720 that stores preset or predetermined information to perform an operation of the air cleaner 10. The memory unit 720 may store information included in Table 1. That is, the memory unit 720 may store a value sensed by the sensor device 237, mapping information on air quality levels, mapping information on pollution levels, and mapping information on display colors, for example. In addition, the memory unit 720 may store information on a number of modules to be operated and an air volume when the automatic operation mode or the lower module concentration operation mode is selected.

The air cleaner 10 may include the controller 700, which may control driving of the first fan motor 165, the second fan motor 265, the third fan motor 335, the first gear motor 363, the second gear motor 367, or the display device 600, based on information sensed by the sensor device 237, information input through the input unit 710, or information stored in the memory unit 720. The controller 700 may determine whether the three modules are to be operated, based on an operation mode of the air cleaner 10, and may determine an air volume of each of the three modules, based on information which is input or previously stored.

The method for controlling the air cleaner 10 according to the embodiment will be described with reference to FIG. 15.

The air cleaner 10 may be turned on, and an operation mode may be selected (S11). If the selected operation mode is the manual operation mode (S12), the user may input a module to be operated among the three modules and determine a discharging air volume of the module to be operated through the air volume input unit 717. In other words, the user may operate the air cleaner 10 by selecting any one mode among the single mode, the dual mode, and the circulation mode (S13 and S14).

If the selected operation mode is the automatic operation mode, a concentration of dust or gas contained in air of a cleaning space may be sensed by the sensor device 237, and an air quality level, that is, an air pollution level may be recognized based on the sensed result (S15 and S16). The controller 700 may determine a module to be operated or an air volume, based on the recognized air pollution level (S17). That is, as the air pollution level increases, the number of devices to be operated among the plurality of air cleaning modules 100 and 200 and the air flow control device 300 may increase.

For example, when the air pollution level is relatively low, that is, when the pollution level is in the "good state" or "normal state," the controller 700 may control the air cleaner 10 to operate the first air cleaning module 100. On the other hand, when the air pollution level is at a moderate level, that is, when the pollution level is in the "bad state," the controller 700 may control the air cleaner 10 to operate the first and second air cleaning modules 100 and 200.

In addition, when the air pollution level is at a high level, that is, when the pollution level is in the "very bad state," the controller 700 may control the air cleaner 10 to operate the first and second air cleaning modules 100 and 200 and the air flow control device 300. At this time, the air volume of the module to be operated may be preset or predetermined as the "weak air." However, if an input is input through the air volume input unit 717, the air volume of the module to be operated may be changed.

If the selected operation mode is the lower module concentration operation mode, a concentration of dust or gas contained in air of a cleaning space may be sensed by the sensor device 237, and an air quality level, that is, an air pollution level may be recognized based on the sensed result (S18 and S19). The controller 700 may determine an air volume of the first air cleaning module 100, based on the recognized air pollution level. That is, as the air pollution level increases, the air volume of the first cleaning module 100.

Figure 16:
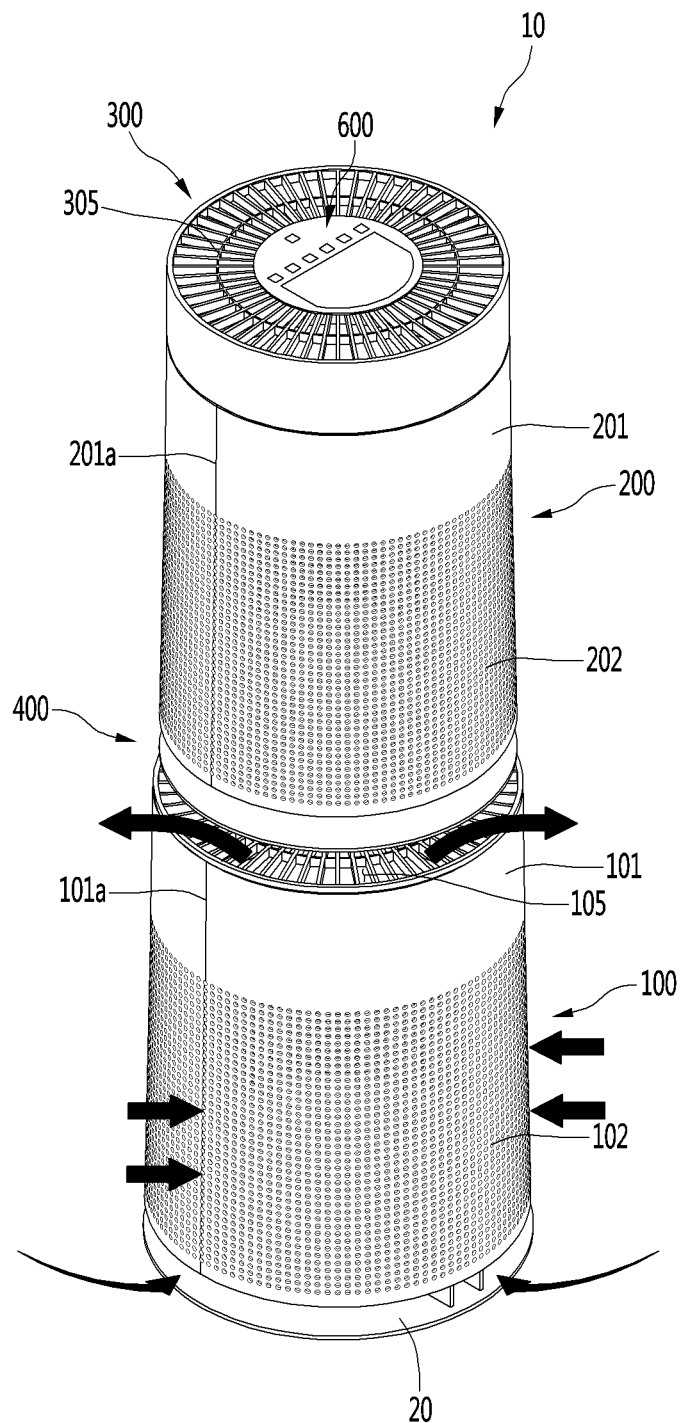
FIGS. 16 and 17 are views illustrating a state in which air flows when only a lower module of the air cleaner is driven according to an embodiment.
Figure 17:
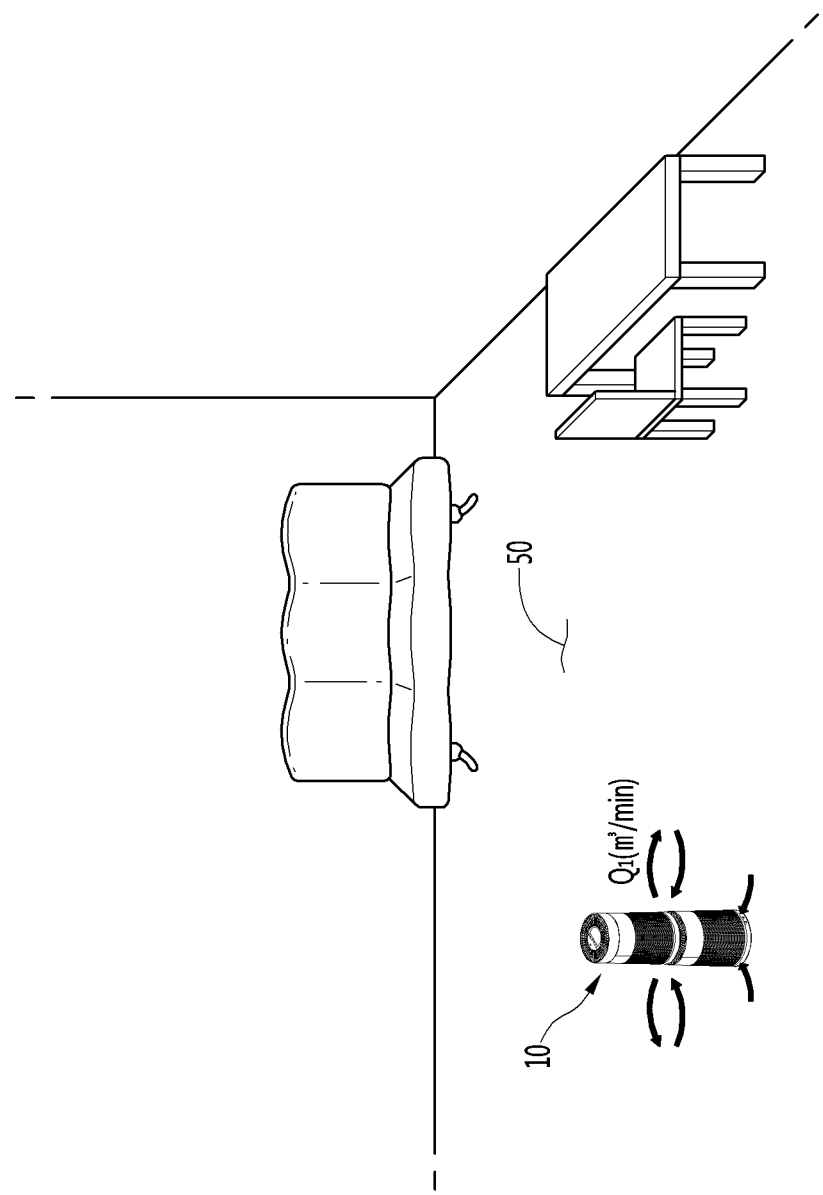

FIGS. 16 and 17 are views illustrating a state in which air flows when only the lower module of the air cleaner is driven according to an embodiment. Referring to FIG. 16, the air cleaner 10 may be controlled to operate only the lower module 100. For example, this operation may be performed in an operation mode of the air cleaner 10, that is, each of the manual operation mode, the automatic operation mode, and the lower module concentration operation mode.

If the lower module 100 is operated, air in a cleaning space 50 may be suctioned into the lower module 100 through the first suction portion 102. Polluted air suctioned through the first suction portion 102 may be purified by passing through the first filter 120 and then discharged to the cleaning space through the first discharge portion 105 by passing through the first fan 160.

As one module among the three modules provided in the air cleaner 10 is operated, the amount of air circulated through the air cleaner 10, that is, cleaning ability may be relatively small. Therefore, when the cleaning space 50 is relatively small, for example, when cleaning is performed for a small room, the user may select the manual operation mode and execute the single mode.

For example, the cleaning ability of the air cleaner 10 may be Q1 ($m_3$) per minute. It will be apparent that the cleaning ability Q1 may be slightly changed depending on a rotation speed of the first fan 160.

Figure 18:
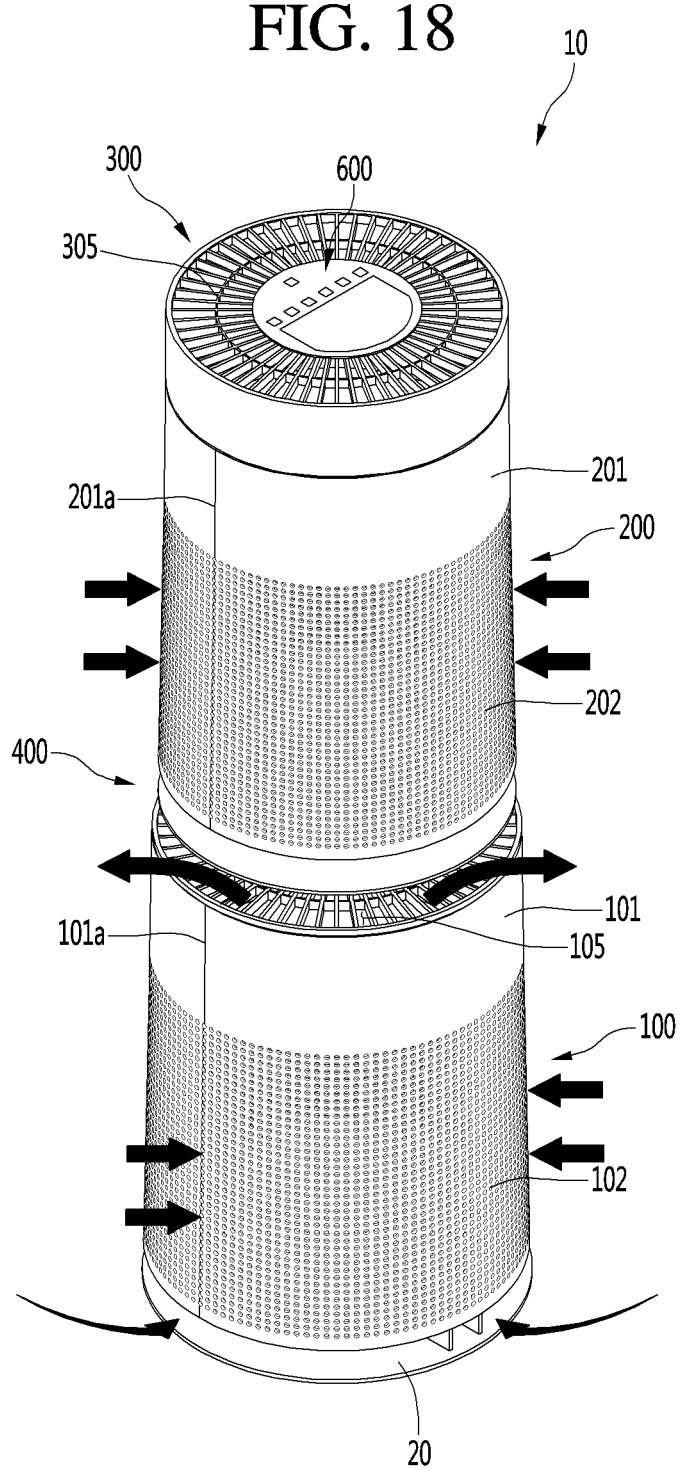
FIGS. 18 and 19 are views illustrating a state in which air flows when the upper and lower modules of the air cleaner are driven according to an embodiment.
Figure 19:
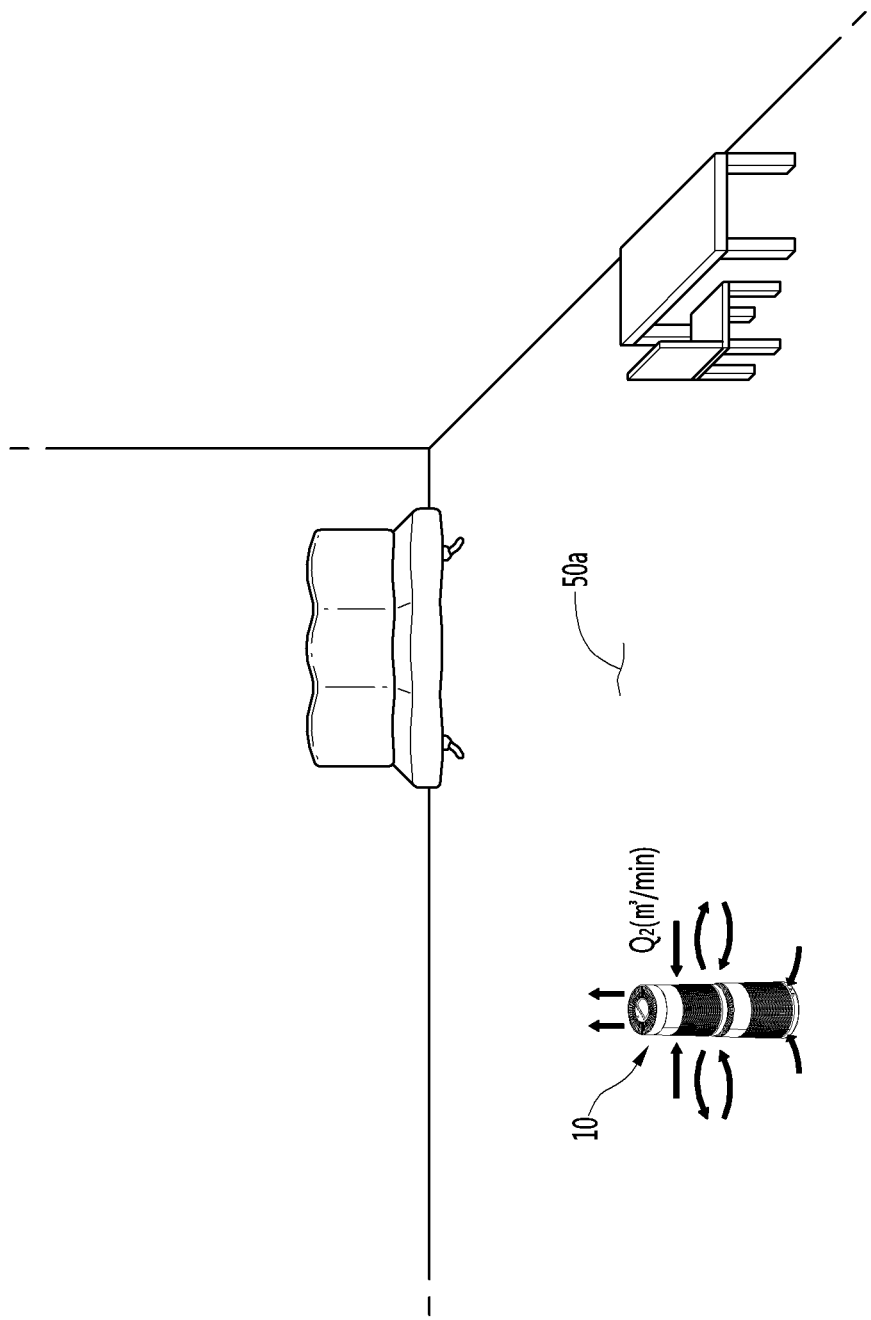

FIGS. 18 and 19 are views illustrating a state in which air flows when the upper and lower modules of the air cleaner are driven according to an embodiment. The air cleaner 10 according to an embodiment may be controlled to operate the lower module 100 and the upper module 200. For example, this operation may be performed in an operation mode of the air cleaner 10, that is, each of the manual operation mode, the automatic operation mode, and the lower module concentration operation mode.

If the lower module 100 and the upper module 200 are operated, air in a cleaning space 50*a* may be suctioned in to the lower module 100 and the upper module 200 through the respective first and second suction portions 102 and 202. Polluted air suctioned in to the lower module 100 may be purified by passing through the first filter 120 and then discharged to the cleaning space 50*a* through the first discharge portion 105 by passing through the first fan 160.

In addition, polluted air suctioned to the upper module 200 may be purified by passing through the second filter 220 and then discharged to the cleaning space 50*a* through the second discharge portion 305 by passing through the second fan 260. The third fan motor 335 may be driven with a set rotation number. If the third fan 330 is not driven when the upper module 200 is operated, the third fan 330 may act as a resistance against air which passes through the second fan 260. Therefore, the rotation number of the third fan 330 may be controlled corresponding to the rotation number of the second fan 260.

As two modules among the three modules provided in the air cleaner 10 are operated, the amount of air circulated through the air cleaner 10, that is, cleaning ability may be relatively large in comparison to when only the lower module 100 is operated. Therefore, when the cleaning space 50*a* is relatively large, for example, when cleaning is performed for a large room, the user may select the manual operation mode and execute the dual mode.

For example, the cleaning ability of the air cleaner 10 may be Q2 (m$_3$) per minute. It will be apparent that the cleaning ability Q2 may be slightly changed depending on a rotation speed of the first fan 160. In addition, the cleaning ability Q2 may have a larger value than the cleaning ability Q1.

Figure 20:
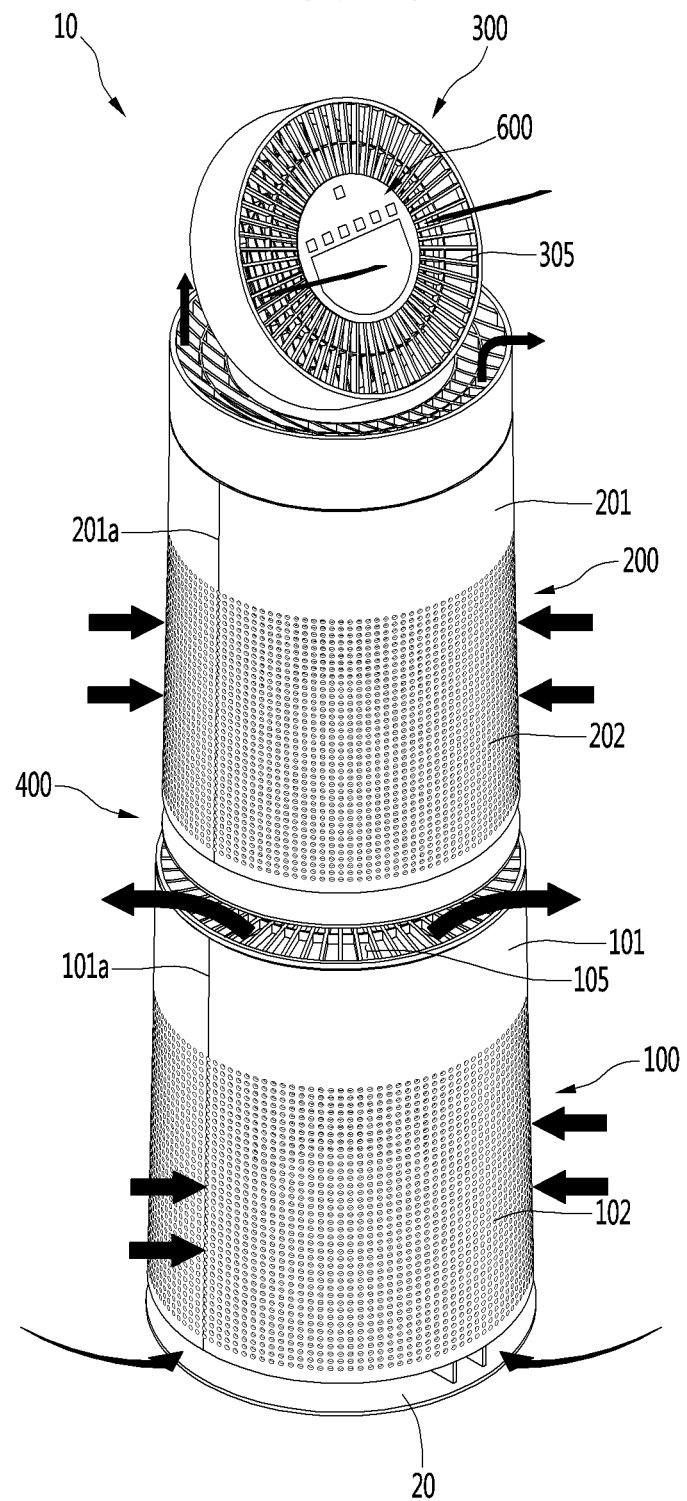
FIGS. 20 and 21 are views illustrating a state in which air flows when air cleaning modules and the air flow control device are driven according to an embodiment.
Figure 21:
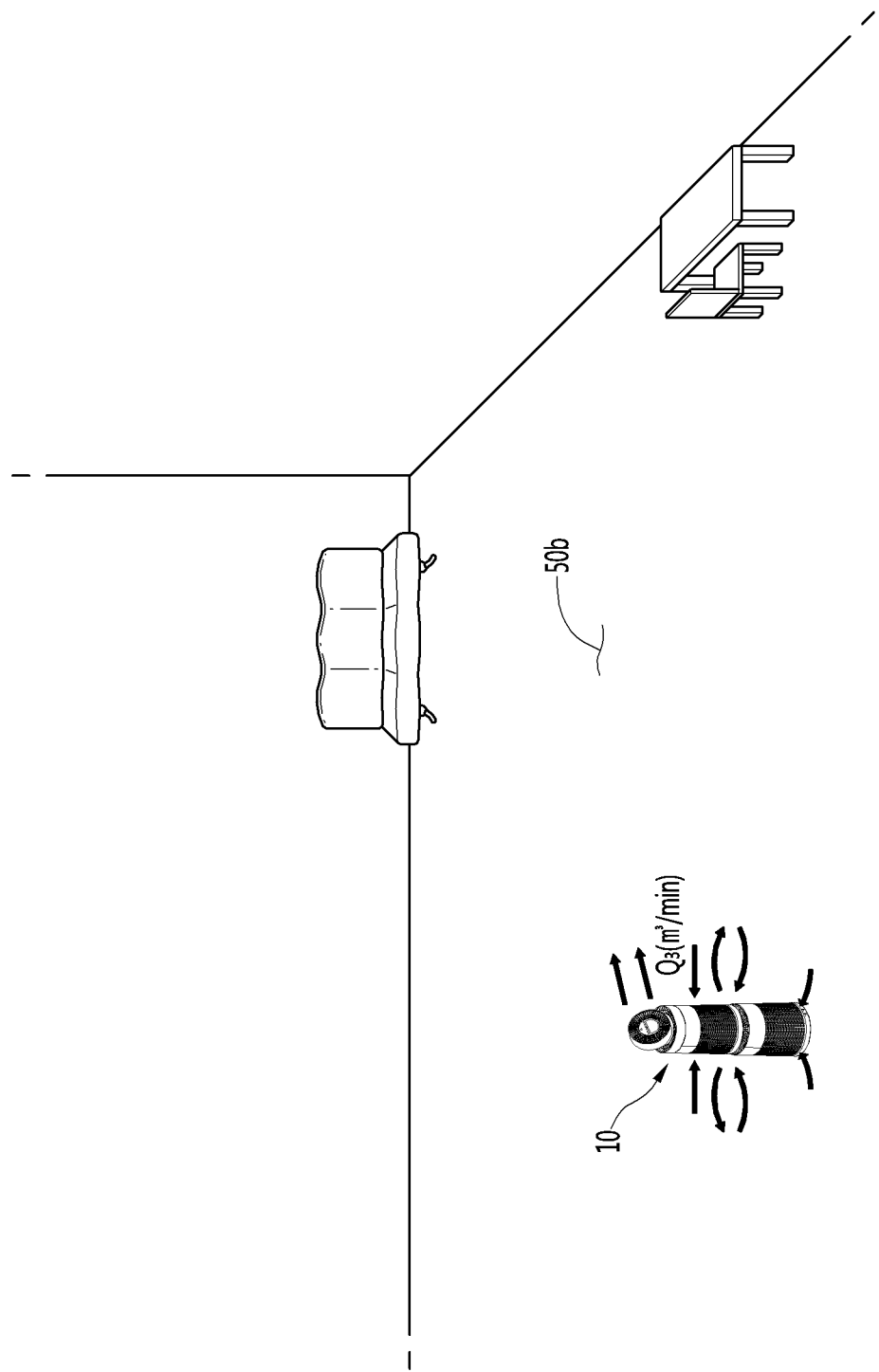

FIGS. 20 and 21 are views illustrating a state in which air flows when the air cleaning modules and the air flow control device are driven according to an embodiment. The air cleaner 10 according to the embodiment may be controlled to operate the lower module 100, the upper module 200, and the air flow control device 300. For example, this operation may be performed in an operation mode of the air cleaner 10, that is, each of the manual operation mode, the automatic operation mode, and the lower module concentration operation mode.

If the lower module 100, the upper module 200, and the air flow control device 300 are operated, air in a cleaning space 50*b* may be suctioned into the lower module 100 and the upper module 200 through the respective first and second suction portions 102 and 202. Polluted air suctioned into the lower module 100 may be purified by passing through the first filter 120 and then discharged to the cleaning space 50*b* through the first discharge portion 105 by passing through the first fan 160.

In addition, polluted air suctioned into the upper module 200 may be purified by passing through the second filter 220 and then discharged to the cleaning space 50*b* through the second discharge portion 305 by passing through the second fan 260. The third fan 330 of the air flow control device 300 may be driven together with the second fan 260, and thus, air which passes through the second fan 260 may have a stronger blowing force while passing through the third fan 330. For example, the rotation number of the third fan 330 may be equal to or greater than the rotation number of the second fan 260.

The air flow control device 300 may be rotated in the upward direction by the second guide (see FIGS. 13 and 21), and accordingly, air may be discharged toward the upper side relative to the air cleaner 10. Thus, clean air may be discharged a relatively distant distance from the air cleaner 10. In addition, the air flow control device 300 may be rotated in the lateral direction by the first guide (see A of FIG. 11), and thus, clean air may be discharged to lateral areas relative to the air cleaner 10.

As all three modules provided in the air cleaner 10 are operated, the amount of air circulated through the air cleaner 10, that is, a cleaning ability may be relatively large in comparison to when only the lower module 100 is operated or when the lower and upper modules 100 and 20 are operated. Therefore, when the cleaning space 50*b* is relatively large, for example, when cleaning is performed on an office or a large living room, the user may select the manual operation mode and execute the circulation mode.

For example, the cleaning ability of the air cleaner 10 may be Q3 (m$_3$) per minute. It will be apparent that the cleaning ability Q3 may be slightly changed depending on a rotation speed of the first fan 160. In addition, the cleaning ability Q3 may have a larger value than the cleaning ability Q1 or the cleaning ability Q2.

According to this operation of the air cleaner, an optimized operation of the air cleaner may be performed based on the size of a cleaning space, the air pollution level, or the necessity of a concentration operation in a lower area of the cleaning space.

According to embodiments disclosed herein, the air cleaner may include an air cleaning module and a plurality of modules including an air flow control device or controller which is capable of discharging purified air which passes through the air cleaning module a long distance, and the plurality of modules may be selectively driven based on a size of a cleaning space or a desired air cleaning amount, so that it is possible to improve air cleaning efficiency and to increase user satisfaction. Further, a plurality of operation modes which are capable of controlling an operation of the air cleaner may be set, and any one operation mode among the plurality of operation modes may be determined based on a user's reference, so that a user's convenience may be increased. In particular, the plurality of operation modes may include a manual operation mode in which a user may select operation conditions, that is, a number of modules to be operated and an air volume, and the user may directly control an air cleaning amount or air cleaning speed as a desired value by selecting the manual operation mode. Furthermore, the plurality of operation modes may include an automatic operation mode in which operation conditions may be determined based on an air pollution level, and a kind or number of modules to be operated and an air volume may be automatically controlled based on the air pollution level, so that an air cleaning operation may be efficiently performed suitable for characteristics of a cleaning space.

The air cleaner may include a dust sensor and a gas sensor, so that the air pollution level may be easily determined. In particular, when the air cleanliness is not good, that is, as the air pollution level increases, the number of modules to be operated may be increased, and a discharge air volume may be increased, so that a purifying action of a cleaning air may be rapidly performed. When the level of the air cleanliness is equal to or greater than a set or predetermined level, purified air may be supplied a long distance from the air cleaner by driving the air flow control device among the plurality of modules, thereby improving air cleaning efficiency.

Since dust which exists in a cleaning space is heavier than air, the dust may accumulate at a lower portion of the cleaning space. Thus, the air cleaning performance of the air cleaner may be improved by first driving the lower module among the plurality of modules and sequentially driving the upper module and the air flow control device as the pollution level increases.

As the plurality of operation modes may include a lower module concentration operation mode in which a lower area of a cleaning space may be intensively purified, the user selects the lower module concentration operation mode, to first clean the lower area of the cleaning space, which has a relatively high pollution level, while consuming low power. In particular, when a child or baby a respiratory function of which is weak is located in the lower area of the cleaning space, the effect of the lower module concentration operation mode may be more remarkable.

In addition, discharge of air in the upward direction may be guided through the upper module and a discharge of air in the frontward direction may be guided by the air flow control device, which may be provided on the upper side of the second blowing device. Discharge of air in the lateral direction may be guided, in a process of rotating of the air flow control device. Finally, an air cleaning function of the indoor space may be improved as discharge of air in various directions may be guided relative to the air cleaner and a discharge air flow may extend to a long distance from the air cleaner. A discharge air flow may be easily generated toward a circumferential space of a person in a room whether the person in the room sitting down or standing up.

As the air flow control device may include a third fan, air may be discharged by adding a flow force generated by the third fan to air which flows through the second air blowing device. Accordingly, a strong discharge current may be generated and thus, may reach a position distant from the air cleaner.

The display device may be provided at an upper portion of the air flow control device, so that operation information of the air cleaner may be easily recognized to the outside. In particular, the display device may well be exposed to the outside not only when the air flow control device is in an inclined state (second position) relative to the axial direction but also when the air flow control device is in a laid out state (first position). Accordingly, operation information of the air cleaner may be easily identified.

In addition, a plurality of modules may be provided, so that a blowing capacity of the air cleaner may be improved. Further, air flows which are independent from each other may be generated through a plurality of air cleaning modules, so that it is possible to prevent a phenomenon that the air flows interfere with each other. Accordingly, the air flow performance of the air cleaner may be improved.

Embodiments disclosed herein provide an air cleaner which is capable of controlling an air volume of air discharged based on a size of a space to be cleaned (hereinafter, referred to as a "cleaning space"). In particular, embodiments disclosed herein provide an air cleaner which is capable of independently driving a plurality of modules, based on a required air cleaning amount.

Embodiments disclosed herein provide an air cleaner which is capable of determining an air pollution level (or air cleanliness) through a sensor device and selectively driving the plurality of modules, based on the determined air pollution level. In particular, embodiments disclosed herein provide an air cleaner in which a number of modules to be operated may increase as the air pollution level increase.

Embodiments also disclosed herein provide an air cleaner which is capable of controlling an operation suitable for a user's preference by providing a plurality of operation modes. In particular, embodiments disclosed herein provide an air cleaner which is capable of easily conditioning a cleaning space through a manual operation mode, an automatic operation mode, and a lower module concentration operation mode.

Embodiments disclosed herein provide an air cleaner which is capable of improving a suction capacity of air suctioned into the air cleaner. In particular, embodiments disclosed herein provide an air cleaner which is capable of sufficiently suctioning air toward a surrounding space of a person in a room whether the person in the room is sitting down or standing up by including a suction flow path directed into the inside of the air cleaner from the circumferential direction of the air cleaner and a suction flow path which is introduced through upper and lower portions of the air cleaner.

Embodiments disclosed herein provide an air cleaner which is capable of discharging air from the air cleaner in various directions and sending the discharged air long distance. In particular, embodiment disclosed herein provide an air cleaner which is capable of easily discharging air toward a surrounding space of a person in a room whether the person in the room sitting down or standing up by a discharge air flow being easily generated in an upward direction, a frontward direction, and lateral directions of the air cleaner.

Embodiments disclosed herein provide an air cleaner which includes a display device which is capable of easily displaying operation information of the air cleaner to the outside. In particular, embodiments disclosed herein provide an air cleaner which is capable of easily identifying operation information of the air cleaner regardless of a position of a rotatable air flow control device as the display device is provided in the air flow control device.

Embodiments disclosed herein provide an air cleaner that may include a plurality of air cleaning modules including a fan and a filter member or filter, the plurality of air cleaning modules being arrayed in upper and lower directions; an air flow control device controller that is disposed or provided at an upper side of the plurality of air cleaning modules and including a circulation fan; a sensor device or sensor configured to sense a pollution level in a room space; an input device or input configured to receive input of a command for operation modes to operate the plurality of air cleaning modules or the air flow control device; and a controller configured to drive the fan or the circulation fan selectively and determine the amount of discharge air flow, based on the operation modes input from the input device or an pollution level sensed in the sensor device. The operation modes may include a manual operation mode where a device to be operated among the plurality of air cleaning modules and the air flow control device and the amount of air flow may be selected.

The operation modes may include an automatic operation mode to determine a device to be operated among the plurality of air cleaning modules and the air flow control device, depending on a pollution level sensed by the sensor device. When the automatic operation mode is performed, the controller may determine that a number of the devices to be operated among the plurality of air cleaning modules and the air flow control device increases as the pollution level increases.

The controller may control one module of the plurality of air cleaning modules to be operated, when the pollution level is equal to or less than a first reference pollution level. The plurality of air cleaning modules may include a lower module and an upper module. The one air cleaning module may include the lower module.

When the pollution level is equal to or higher than the first reference pollution level and equal to or less than a second reference pollution level, the controller may control all the plurality of air cleaning modules to be operated. When the pollution level is equal to or higher than the second pollution level, the controller may control the plurality of air cleaning modules and the air flow control device to be operated.

The first reference pollution level may indicate a first dust amount sensed in a dust sensor. The second reference pollution level may indicate a second dust amount sensed in the dust sensor. The second dust amount may be greater than the first dust amount.

When the automatic operation mode is performed, the controller may control the air cleaner to discharge a predetermined amount of air flow, regardless of the pollution levels. The operation modes may further include a lower module concentration operation mode where a lower module of the plurality of air cleaning modules is operated and the amount of air flow is determined depending on the pollution level.

Embodiments disclosed herein provide a method for controlling an air cleaner including a lower air cleaning module having a first fan, a first inhaler and a first outlet, an upper air cleaning module having a second inhaler and a second fan, and an air flow control device having a second outlet to discharge air passing through the upper air cleaning module and a circulation fan. The method may include selecting an operation mode through an input device or input; sensing a pollution level in a room space when the selected operation mode includes an automatic mode; and performing, based on the pollution level, a single operation of the lower air cleaning module, a combination operation of the lower air cleaning module and the upper air cleaning module, or a combination operation of the lower air cleaning module, the upper air cleaning module and the air flow control device.

The single operation of the lower air cleaning module may be performed when the pollution level is equal to or less than a first reference pollution level. The combination operation of the lower air cleaning module and the upper air cleaning module may be performed when the pollution level is equal to or higher than the first reference pollution level and equal to or less than a second reference pollution level. The combination operation of the lower air cleaning module, the upper air cleaning module and the air flow control device may be performed when the pollution level is equal to or higher than the second reference pollution level.

The operation mode may further include a lower module concentration operation mode. When the lower module concentration operation mode is selected, the amount of air flow discharged from the lower air cleaning module may be controlled to increase as the pollution level sensed in the sensor device increases.

The single operation of the lower air cleaning module may be performed to discharge the amount of a first air flow. The combination operation of the lower air cleaning module and the upper air cleaning module may be performed to discharge the amount of a second air flow. The combination operation of the lower air cleaning module, the upper air cleaning module and the air flow control device may be performed to discharge the amount of a third air flow. The amount of the second air flow may be greater than the amount of the first air flow, and the amount of the third air flow may be greater than the amount of the second air flow.

Embodiments disclosed herein further provide an air cleaner that may include a plurality of air cleaning modules including a fan and a filter member of filter, respectively, the plurality of air cleaning modules being arrayed in upper and lower directions; an air flow control device or controller provided at an upper side of the plurality of air cleaning modules, the air flow control device including a circulation fan; an input device configured to receive input of a command for operation modes to operate the plurality of air cleaning modules or an air flow control device; and a controller configured to control the amount of air flow discharged from the fan or the circulation fan, based on the operation mode input from the input device.

The operation mode may include a manual operation mode configured to select a device to be operated among the plurality of air cleaning modules and the air flow control device or an amount of air flow; an automatic operation mode configured to determine a device to be operated among the plurality of air cleaning modules and air flow control device or the amount of air flow by the controller, based on a pollution level in a room space; and a lower module concentration operation mode configured to determine the amount of air flow of the lower air cleaning module of the plurality of air cleaning modules by the controller, based on the pollution level in the room space. When the pollution level is within a range of a reference pollution level, in a case that the automatic operation mode is selected, the controller may control each of the plurality of air cleaning modules to discharge the amount of a first air flow.

When the pollution level is within a range of the reference pollution level, in a case that the lower module concentration operation mode is selected, the controller may control the lower air cleaning module to discharge the amount of a second air flow. The amount of the second air flow may be greater than the amount of the first air flow.

The plurality of air cleaning modules may include an upper air cleaning module and a lower air cleaning module, each generating an independent air flow. The air flow control device may control an air flow generated in the upper air cleaning module.

The details of one or more embodiments are set forth in the accompanying drawings and the description. Other features will be apparent from the description and drawings, and from the claims.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An air cleaner, comprising:
a first air cleaning module having a first fan and a first filter;
a second air cleaning module having a second fan and a second filter, the second air cleaning module provided vertically over the first air cleaning module;
an air flow controller provided at an upper side of the second air cleaning module and including a circulation fan;
a sensor configured to sense a pollution level in a room space;
an input configured to receive input of a command for an operation mode of a plurality of operation modes to operate the first and second air cleaning modules, and the air flow controller; and
a controller configured to drive at least one of the first fan, the second fan, or the circulation fan selectively and determine an amount of discharge air flow, wherein based on at least one of an operation mode input or the pollution level, the controller operates one of (1) the first fan, (2) the first and second fans, (3) the first and second fans and the circulation fan, or (4) the second fan and the circulation fan.

2. The air cleaner of claim 1, wherein the plurality of operation modes include a manual operation mode in which a device to be operated among the first and second air cleaning modules and the air flow controller and the amount of discharge air flow are selected by a user.

3. The air cleaner of claim 1, wherein the plurality of operation modes include an automatic operation mode in which a device to be operated among the air cleaning modules and the air flow controller, is automatically determined based on a pollution level sensed by the sensor.

4. The air cleaner of claim 1, wherein when the automatic operation mode is performed, the controller determines that a number the devices operated among the first and second air cleaning modules and the air flow controller increases as the pollution level increases.

5. The air cleaner of claim 4, wherein the controller controls one module of the first and second cleaning modules to be operated, when the pollution level is equal to or less than a first reference pollution level.

6. The air cleaner of claim 5, wherein the first and second cleaning modules include a lower module and an upper module, and wherein the one air cleaning module includes the lower module.

7. The air cleaner of claim 5, wherein when the pollution level is equal to or higher than the first reference pollution level and equal to or less than a second reference pollution level, the controller controls of all the first and second air cleaning modules to be operated.

8. The air cleaner of claim 7, wherein when the pollution level is equal to or higher than the second pollution level, the controller controls the first and second cleaning modules and the air flow controller to be operated.

9. The air cleaner of claim 8, wherein the sensor includes a dust sensor, wherein the first reference pollution level indicates a first dust amount sensed by the dust sensor, wherein the second reference pollution level indicates a second dust amount sensed by the dust sensor, and wherein the second dust amount is greater than the first dust amount.

10. The air cleaner of claim 4, wherein when the automatic operation mode is performed, the controller controls the device operating to discharge a predetermined amount of air flow, regardless of the pollution level.

11. The air cleaner of claim 1, wherein the operation mode further includes a lower module concentration operation mode in which a lower module of the first and second cleaning modules is operated and the amount of air flow is determined depending on the pollution level.

12. A method for controlling an air cleaner including a lower air cleaning module having a first fan, a first inlet, and a first outlet; an upper air cleaning module having a second inlet and a second fan; and an air flow controller having a second outlet to discharge air passing through the upper air cleaning module and a circulation fan, the method comprising:
receiving selection of an operation mode through an input;
sensing via a sensor a pollution level in a room space when the selected operation mode includes an automatic mode; and
performing, based on the pollution level, one of a single operation of the lower air cleaning module, a combination operation of the lower air cleaning module and the upper air cleaning module, or a combination operation of the lower air cleaning module, the upper air cleaning module, and the air flow controller.

13. The method of claim 12, wherein the single operation of the lower air cleaning module is performed when the pollution level is equal to or less than a first reference pollution level, the combination operation of the lower air cleaning module and the upper air cleaning module is performed when the pollution level is equal to or higher than the first reference pollution level and equal to or less than a second reference pollution level, and the combination operation of the lower air cleaning module, the upper air cleaning module, and the air flow controller is performed when the pollution level is equal to or higher than the second reference pollution level.

14. The method of claim 12, wherein the operation mode further includes a lower module concentration operation mode, and wherein when the lower module concentration operation mode is selected, an amount of air flow discharged from the lower air cleaning module is controlled to increase as the pollution level sensed by the sensor increases.

15. The method of claim 12, wherein the single operation of the lower air cleaning module is performed to discharge a first air flow amount, wherein the combination operation of the lower air cleaning module and the upper air cleaning module is performed to discharge a second air flow amount, wherein the combination operation of the lower air cleaning module, the upper air cleaning module, and the air flow controller is performed to discharge a third air flow amount, and wherein the second air flow amount is greater than the first air flow amount, and the third air flow amount is greater than the second air flow.

16. An air cleaner, comprising:
a plurality of air cleaning modules including a fan and a filter, respectively, the plurality of air cleaning modules being arrayed in a vertical direction;
an air flow controller provided at an upper side of the plurality of, air cleaning modules, the air flow controller including a circulation fan;
an input configured to receive input of a command for an operation mode of a plurality of operation modes to operate the plurality of air cleaning modules or the air flow controller; and a controller configured to control an amount of air flow discharged from the fan or the circulation fan, based on the operation mode input to the input.

17. The air cleaner of claim 16, wherein the plurality of operation modes includes:
a manual operation mode in which a device to be operated among the plurality of air cleaning modules and the air flow controller or the amount of air flow is selected by a user;
an automatic operation mode in which a device to be operated among the plurality of air cleaning modules and the air flow controller or the amount of air flow is automatically detected by the controller, based on a pollution level in room space; and
a lower module concentration operation mode in which the amount of air flow of the lower air cleaning module of the plurality of air cleaning modules is determined by the controller, based on the pollution level in the room space.

18. The air cleaner of claim 17, wherein when the pollution level is within a range of a reference pollution level, in a case in which the automatic operation mode is selected, the controller controls each of the plurality of air cleaning modules to discharge a first air flow amount.

19. The air cleaner of claim 18, wherein when the pollution level is within a range of the reference pollution level, in a case in which the lower module concentration operation mode is selected, the controller controls the lower air cleaning module to discharge a second air flow amount, and wherein the second air flow amount is greater than the first air flow amount.

20. The air cleaner of claim 16, wherein the plurality of air cleaning modules include an upper air cleaning module and a lower air cleaning module, each generating an independent air flow, and wherein the air flow controller controls an air flow generated in the upper air cleaning module.

* * * * *